(12) United States Patent
Poitau et al.

(10) Patent No.: US 10,959,155 B2
(45) Date of Patent: Mar. 23, 2021

(54) METHOD AND APPARATUS FOR PERFORMING DEVICE-TO-DEVICE DISCOVERY

(71) Applicant: INTERDIGITAL PATENT HOLDINGS, INC., Wilmington, DE (US)

(72) Inventors: Gwenael Poitau, Montréal (CA); Ghyslain Pelletier, Montréal (CA); Paul Marinier, Brossard (CA); Diana Pani, Montréal (CA); Samian Kaur, Plymouth Meeting, PA (US); Benoit Pelletier, Roxboro (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/837,876

(22) Filed: Dec. 11, 2017

(65) Prior Publication Data
US 2018/0115937 A1 Apr. 26, 2018

Related U.S. Application Data

(63) Continuation of application No. 13/973,272, filed on Aug. 22, 2013, now Pat. No. 9,843,986.
(Continued)

(51) Int. Cl.
*H04W 4/00* (2018.01)
*H04W 40/24* (2009.01)
(Continued)

(52) U.S. Cl.
CPC .......... *H04W 40/246* (2013.01); *H04L 67/16* (2013.01); *H04W 76/14* (2018.02); *H04W 8/005* (2013.01)

(58) Field of Classification Search
CPC ... H04W 40/246; H04W 76/14; H04W 8/005; H04L 67/16
(Continued)

(56) References Cited

U.S. PATENT DOCUMENTS

| 7,961,708 B2 | 6/2011 | Li et al. |
| 8,634,836 B2 | 1/2014 | Pani et al. |

(Continued)

FOREIGN PATENT DOCUMENTS

| WO | 11/130630 | 10/2011 |
| WO | 12/088470 | 6/2012 |

OTHER PUBLICATIONS

Direct Mode Operation (DMO), TETRA Website visited available at http://www.tandcca.com/about/page/12026 (last visited Nov. 22, 2013).
(Continued)

*Primary Examiner* — Chuong T Ho
(74) *Attorney, Agent, or Firm* — Volpe Koenig

(57) ABSTRACT

Methods and apparatus for performing device-to-device (D2D) discovery are described. A service discovery process may include a discoverable device (e.g., a wireless transmit/receive unit (WTRU)) sending a discovery request, over a wireless connection, for a radio resource for the purpose of performing a transmission for radio frequency (RF) proximity detection for a given service. The WTRU may receive a discovery response including a configuration for RF proximity detection from a network, which configuration may be associated to the service. The configuration for RF proximity may be received by dedicated signaling, (e.g., physical downlink shared channel (PDSCH)), in particular for a discoverable WTRU. The configuration for RF proximity may be received on a broadcast channel, (e.g., a discovery shared channel (DISCH)), in particular for a monitoring
(Continued)

WTRU, and may include one or more service identities, each associated with an RF proximity detection configuration, or a validity information and a measurement configuration.

8 Claims, 13 Drawing Sheets

Related U.S. Application Data

(60) Provisional application No. 61/863,260, filed on Aug. 7, 2013, provisional application No. 61/752,830, filed on Jan. 15, 2013, provisional application No. 61/692,556, filed on Aug. 23, 2012.

(51) Int. Cl.
*H04W 76/14* (2018.01)
*H04L 29/08* (2006.01)
*H04W 8/00* (2009.01)

(58) Field of Classification Search
USPC ........ 370/252–254, 344–347, 328, 329, 330, 370/389, 390; 709/224, 228
See application file for complete search history.

(56) References Cited

U.S. PATENT DOCUMENTS

| | | | |
|---|---|---|---|
| 8,769,108 | B2 | 7/2014 | Meylemans et al. |
| 2005/0157665 | A1 | 7/2005 | Nanda |
| 2006/0135174 | A1 | 6/2006 | Kraufvelin et al. |
| 2008/0189405 | A1 | 8/2008 | Zarenin et al. |
| 2010/0093364 | A1* | 4/2010 | Ribeiro ............... H04W 72/082 455/452.2 |
| 2010/0323633 | A1 | 12/2010 | Pani et al. |
| 2011/0258313 | A1 | 10/2011 | Mallik et al. |
| 2011/0268101 | A1 | 11/2011 | Wang et al. |
| 2011/0294474 | A1 | 12/2011 | Barany |
| 2011/0317586 | A1 | 12/2011 | Palanki et al. |
| 2012/0011247 | A1 | 1/2012 | Mallik et al. |
| 2012/0163235 | A1 | 6/2012 | Ho et al. |
| 2012/0243437 | A1 | 9/2012 | Horn et al. |
| 2012/0322484 | A1 | 12/2012 | Yu et al. |
| 2013/0064138 | A1 | 3/2013 | Hakola |
| 2013/0155962 | A1* | 6/2013 | Hakola ................. H04W 76/14 370/329 |
| 2013/0156190 | A1 | 6/2013 | Selen et al. |
| 2013/0297810 | A1 | 11/2013 | Ho et al. |
| 2013/0308551 | A1* | 11/2013 | Madan ................. H04W 76/14 370/329 |
| 2013/0308552 | A1* | 11/2013 | Madan ................. H04L 5/0094 370/329 |
| 2014/0003262 | A1* | 1/2014 | He ........................ H04W 28/08 370/252 |
| 2014/0254429 | A1* | 9/2014 | Wang .................... H04L 5/0037 370/254 |
| 2014/0269558 | A1* | 9/2014 | Sartori ................. H04W 48/16 370/329 |
| 2014/0286284 | A1* | 9/2014 | Lim ...................... H04W 76/14 370/329 |
| 2014/0314039 | A1* | 10/2014 | Jang ........................ H04L 5/003 370/329 |
| 2014/0334354 | A1* | 11/2014 | Sartori ................. H04L 5/0094 370/280 |
| 2015/0208280 | A1 | 7/2015 | Lorca Hernando |

OTHER PUBLICATIONS

Qualcomm Incorporated, "Study on LTE Device to Device Proximity Services," 3GPP TSG RAN Meeting #58, RP-122009 (Dec. 2012).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.3.0 (Jun. 2013).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).

Third Generation Partnership Project, "Technical Specification Group Radio Access Network; Evolved Universal Terrestrial Radio Access (E-UTRA); Multiplexing and channel ceding (Release 11)," 3GPP TS 36.212 V11.3.0 (Jun. 2013).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.6.0 (Jun. 2012).

Third Generation Partnership Project, "Technical Specification Group Radio Access Network; Evolved Universal Terrestrial Radio Access (E-UTRA); Physical layer procedures (Release 10)," 3GPP TS 36.213 V10.10.0 (Jun. 2013).

Third Generation Partnership Project, "Technical Specification Group Radio Access Network; Evolved Universal Terrestrial Radio Access (E-UTRA); Physical layer procedures (Release 11)," 3GPP TS 36.213 V11.3.0 (Jun. 2013).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.11.0 (Jun. 2012).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.15.0 (Jun. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.6.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.10.0 (Jun. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.4.0 (Jun. 2013).
Third Generation Partnership Project, "Technical Specification Group SA; Feasibility Study for Proximity Services (ProSe) (Release 12)," 3GPP TR 22.803 V0.5.0 (Aug. 2012).
Third Generation Partnership Project, "Technical Specification Group Services and System Aspects; Feasibility study for Proximity Services (ProSe) (Release 12)," 3GPP TR 22.803 V12.2.0 (Jun. 2003).
Third Generation Partnership Project, "Technical Specification Group Services and System Aspects; Study on architecture enhancements to support Proximity Services (ProSe) (Release 12)," 3GPP TR 23.703 V0.4.1 (Jun. 2013).
ZTE, "Solution for ProSe discovery and communication," SA WG2 Meeting #96, S2-130979, San Diego, USA (Apr. 8-12, 2013).
Renesas Mobile Europe Ltd., "Solution for ProSe Discovery P-CR," SA WG2 Meeting #97, S2-132166, Busan, South Korea (May 27-31, 2013).
Intel, "Operator Managed and Operator Assisted D2D ," 3GPP TSG-SA WG1 Meeting #57, S1-120063, Kyoto, Japan (Feb. 13-17, 2012).
Qualcomm Incorporated, "Solution for ProSe assisted WLAN direct communication," SA WG2 Meeting #97, S2-132459, Busan, South Korea (May 27-31, 2013).
HTC, "Network Assisted ProSe discovery and ProSe communication," SA WG2 Meeting #S2-97, S2-131785, Busan, South Korea (May 27-31, 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.10.0 (Jun. 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.6.0 (Jun. 2013).
SA1, "Reply LS on organization of the work on public safety," 3GPP TSG RAN Meeting #57, RP-120923, Chicago, USA (Sep. 4-7, 2012).

* cited by examiner

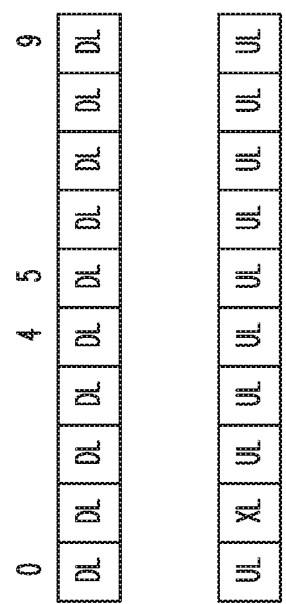

| SIGNAL TYPE | SYNCHRONIZATION REQUIREMENTS | EMBEDDED TIMING INFORMATION | EMBEDDED GUARD BAND/TIME | SIGNAL CONTENT (PAYLOAD/ INDEXING) | FLEXIBILITY (LENGTH/ BANDWIDTH) | SCALABILITY | ROBUSTNESS | DL (OFDMA)/UL (SC-FDMA) SIGNAL |
|---|---|---|---|---|---|---|---|---|
| PSS/SSS | NO | YES | YES (10 SUBCARRIERS) | INDEX | 6 RBs | YES, 504 CELL ID, ZADOFF-CHU BASED | HIGH | DL |
| PSS/SSS + PBCH | NO | YES | YES (10 SUBCARRIERS) | INDEX + PAYLOAD | 6 RBs | 504 CELL ID, ZADOFF-CHU BASED | MEDIUM/HIGH | DL |
| PCFICH | FINE SYNCH. | NO | NO | CODE | 4 REGs 1 SYMBOL | REQUIRES ORTHOGONAL RESOURCES | HIGH | DL |
| PHICH | FINE SYNCH. | NO | NO | CODE | ceil(N_PRB/4) GROUPS OF 8 PHICH EACH | REQUIRES ORTHOGONAL RESOURCES | HIGH | DL |
| PDCCH | FINE SYNCH. | NO | NO | INDEX + PAYLOAD | 1, 2, 4 OR 8 CCEs | REQUIRES ORTHOGONAL RESOURCES | MEDIUM (FOR 8 CCEs) | DL |
| PDSCH | FINE SYNCH. | NO | NO | PAYLOAD | YES | REQUIRES ORTHOGONAL RESOURCES | MEDIUM | DL |
| PRACH | COARSE SYNCH. | YES | YES | INDEX | YES | YES, CAN BE CONTENTION BASED | HIGH | UL |

| | | | | | | |
|---|---|---|---|---|---|---|
| SRS | COARSE SYNCH. | NO | NO | INDEX | 8 SRS CONFIG. (4 TO 96 RBs) | YES, ZADOFF-CHU BASED | HIGH | UL |
| UL-DMRS | COARSE SYNCH. | NO | NO | INDEX | YES | YES, ZADOFF-CHU BASED | HIGH | UL |
| PUCCH | FINE SYNCH. | NO | NO | INDEX + PAYLOAD | NO | REQUIRES ORTHOGONAL RESOURCES | MEDIUM | UL |
| PUSCH | FINE SYNCH. | NO | NO | PAYLOAD | YES | REQUIRES ORTHOGONAL RESOURCES | MEDIUM | UL |

FROM FIG. 7A

FIG. 7B

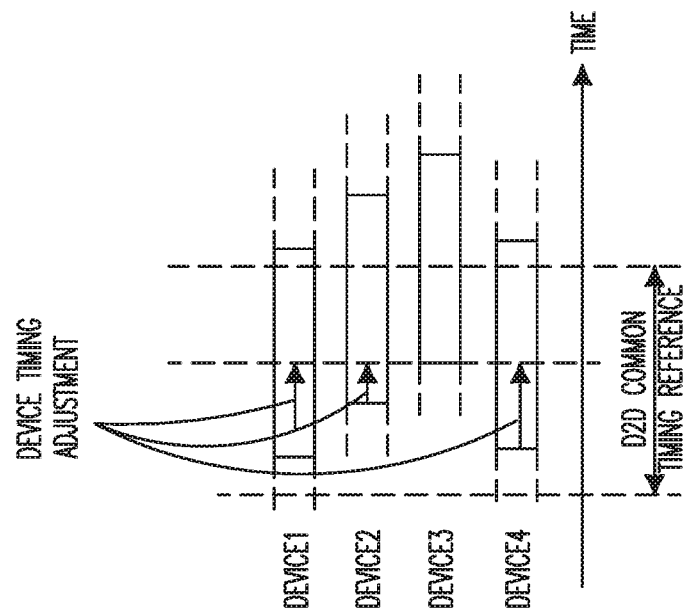
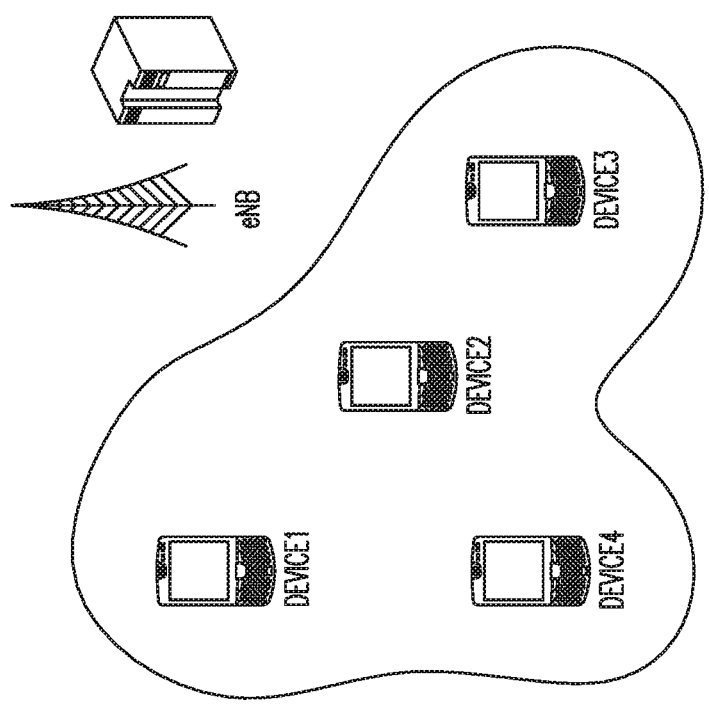
FIG. 9

METHOD AND APPARATUS FOR PERFORMING DEVICE-TO-DEVICE DISCOVERY

CROSS REFERENCE TO RELATED APPLICATIONS

This application is continuation of U.S. application Ser. No. 13/973,272, filed Aug. 22, 2013, which claims the benefit of U.S. Provisional Application Ser. No. 61/692,556 filed Aug. 23, 2012, U.S. Provisional Application Ser. No. 61/752,830 filed Jan. 15, 2013, and U.S. Provisional Application Ser. No. 61/863,260 filed Aug. 7, 2013, the contents of which are incorporated herein by reference in their entirety.

BACKGROUND

Proximity services (ProSe) may support device-to-device (D2D) communication in a cellular technology ecosystem. ProSe may rely on the proximity between two or more devices, (e.g., wireless transmit/receive units (WTRUs), user equipment (UEs), mobile stations), and allow specific commercial and social applications, network offloading, or public safety direct communications. Other alternatives, such as Wi-Fi or Bluetooth, may also support D2D communication, but they may operate on a license-exempt band, and thus they may be subject to higher interference and lower quality of service (QoS). ProSe may use D2D discovery and various communication procedures to address these issues.

SUMMARY

Methods and apparatus for performing device-to-device (D2D) discovery are described. A service discovery process may include a discoverable device (e.g., a wireless transmit/receive unit (WTRU)) sending a discovery request, over a wireless connection, for a radio resource for the purpose of performing a transmission for radio frequency (RF) proximity detection for a given service.

A service discovery process may include a WTRU receiving a discovery response including a configuration for RF proximity detection from a network, which configuration may be associated to the concerned service. The configuration for RF proximity may be received by dedicated signaling (e.g., a physical downlink shared channel (PDSCH)), in particular for a discoverable WTRU. The configuration for RF proximity may be received on a broadcast channel (e.g., a discovery shared channel (DISCH)), in particular for a monitoring WTRU. The transmission received from the broadcast channel may include one or more service identities, each associated with an RF proximity detection configuration (i.e., a transmission resource associated to the service), or a validity information and a measurement configuration. A transmission on a broadcast channel received by the WTRU may be scheduled by a PDSCH using a specific radio network temporary identity (RNTI) or subframe timing.

A service discovery process may include a WTRU initiating an operation using a received RF proximity detection configuration for the concerned service. A discoverable WTRU may determine that it may initiate transmission of an RF proximity detection signal on the configured resource during the validity time of the configured resource. A monitoring WTRU may determine that it may initiate reception of an RF proximity detection signal on the configured resource during the validity time of the configured resource using the associated measurement configuration.

A service discovery process may include a monitoring WTRU detecting an RF proximity signal for the concerned service may trigger a WTRU to 1) initiate a transmission, over a wireless connection, of a measurement report for the concerned measurement object; 2) initiate a request, over a wireless connection, for radio resource configuration for a D2D session that corresponds to the given service (to initiate a D2D data transfer); or 3) initiate a request, over a wireless connection, for a radio resource for the purpose of performing a transmission for RF proximity detection for a given service (for mutual discovery).

A service discovery process may include a WTRU receiving, from a network, a configuration for a D2D channel.

A discoverable WTRU may terminate the RF proximity detection or terminate transmission on an RF signal for proximity detection when the validity of the resource expires, when the WTRU no longer assumes uplink synchronization to a network, or other conditions.

An application in a WTRU may trigger a service discovery procedure with a request to a wireless module that includes a service identity. Priority rules according to discovery classes and the role of the WTRU, (e.g., monitoring, discoverable), are also applicable.

BRIEF DESCRIPTION OF THE DRAWINGS

A more detailed understanding may be had from the following description, given by way of example in conjunction with the accompanying drawings wherein:

FIG. 6 shows an example of a discovery channel allocated in-band time division multiplex (TDM) with UL;

FIGS. 7A and 7B show long term evolution (LTE) signal properties for discovery signal design;

FIG. 9 shows an example of a distributed D2D synchronization strategy with a time window defined by a network.

DETAILED DESCRIPTION

Figure 1A:
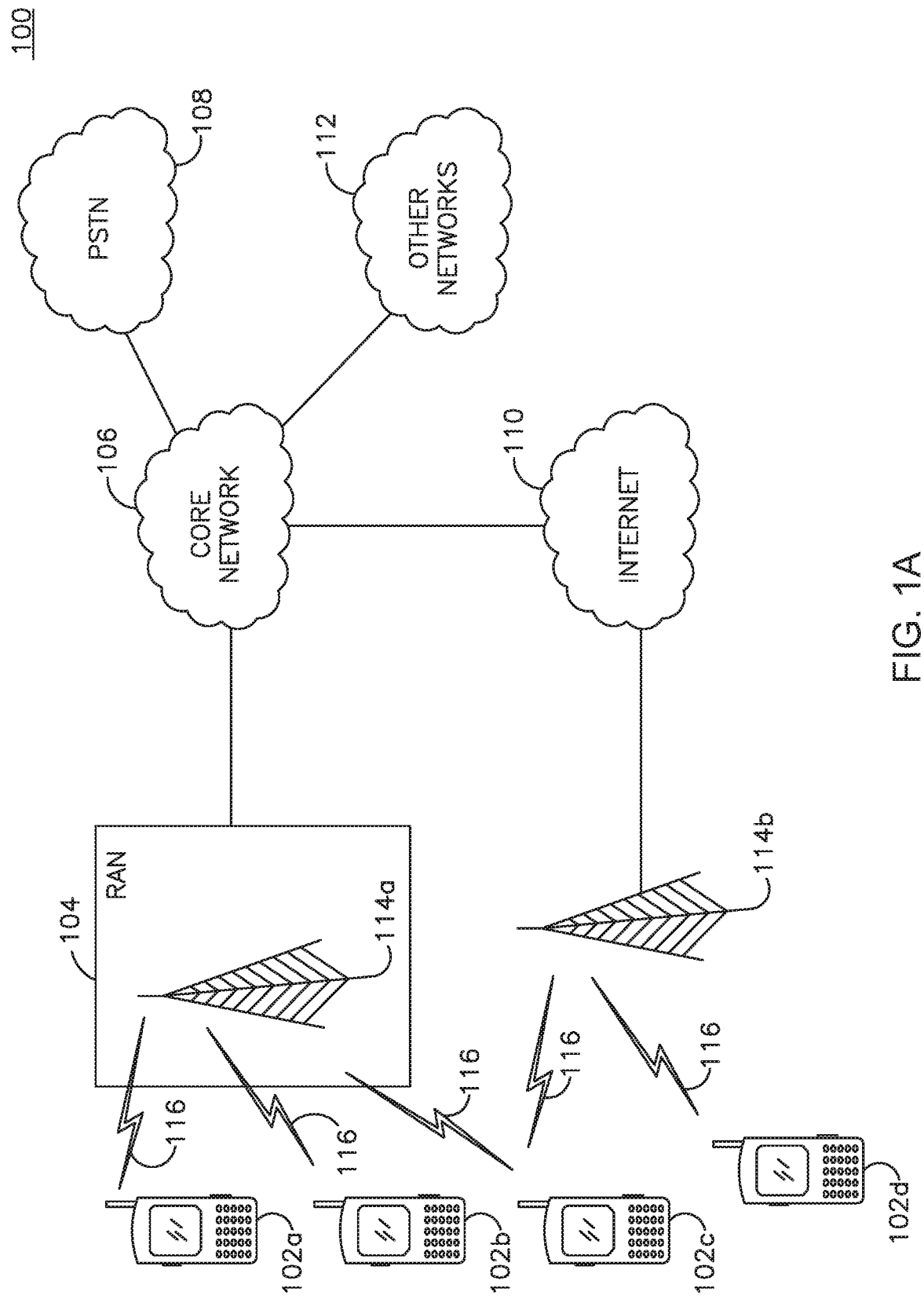
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (0), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
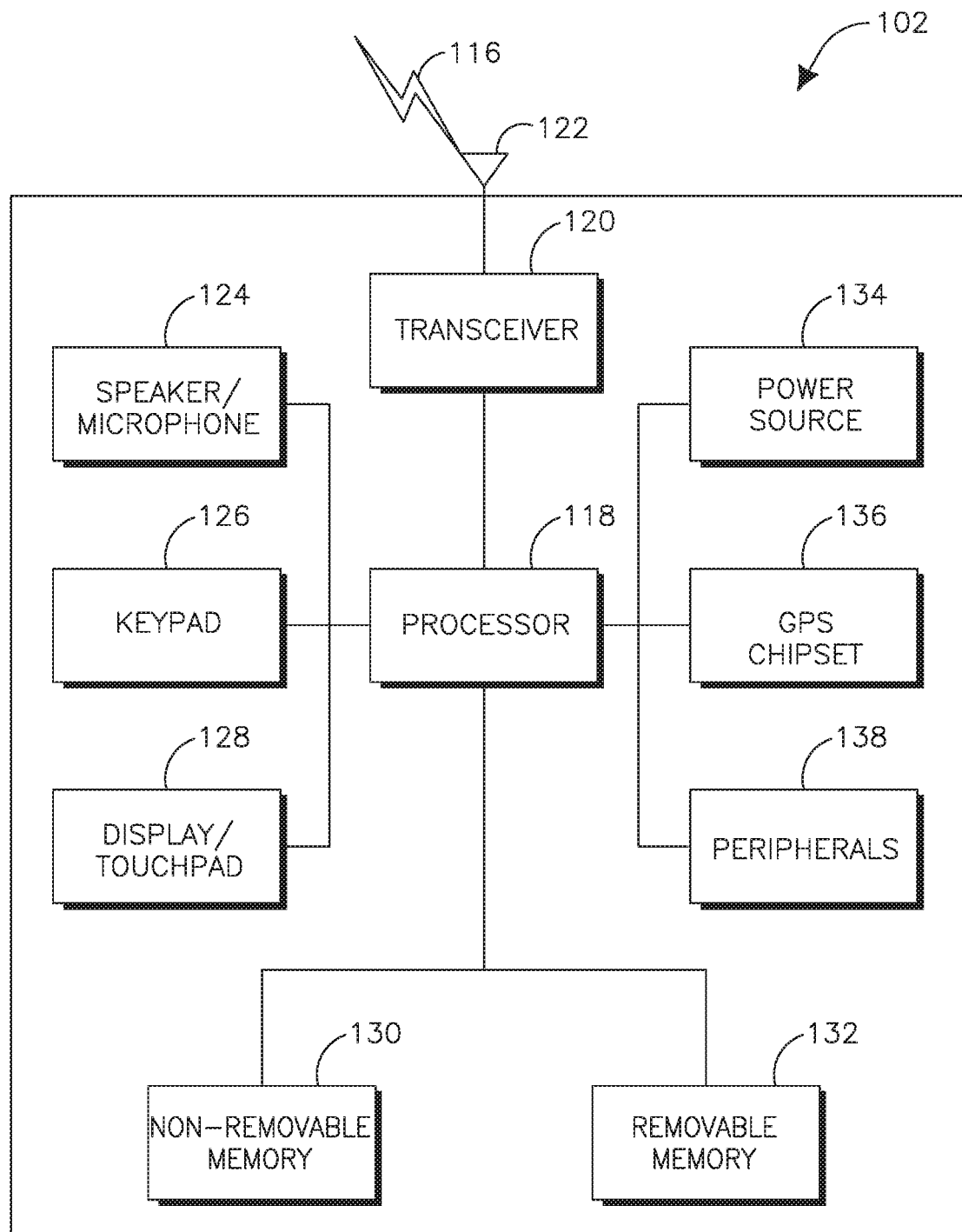
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
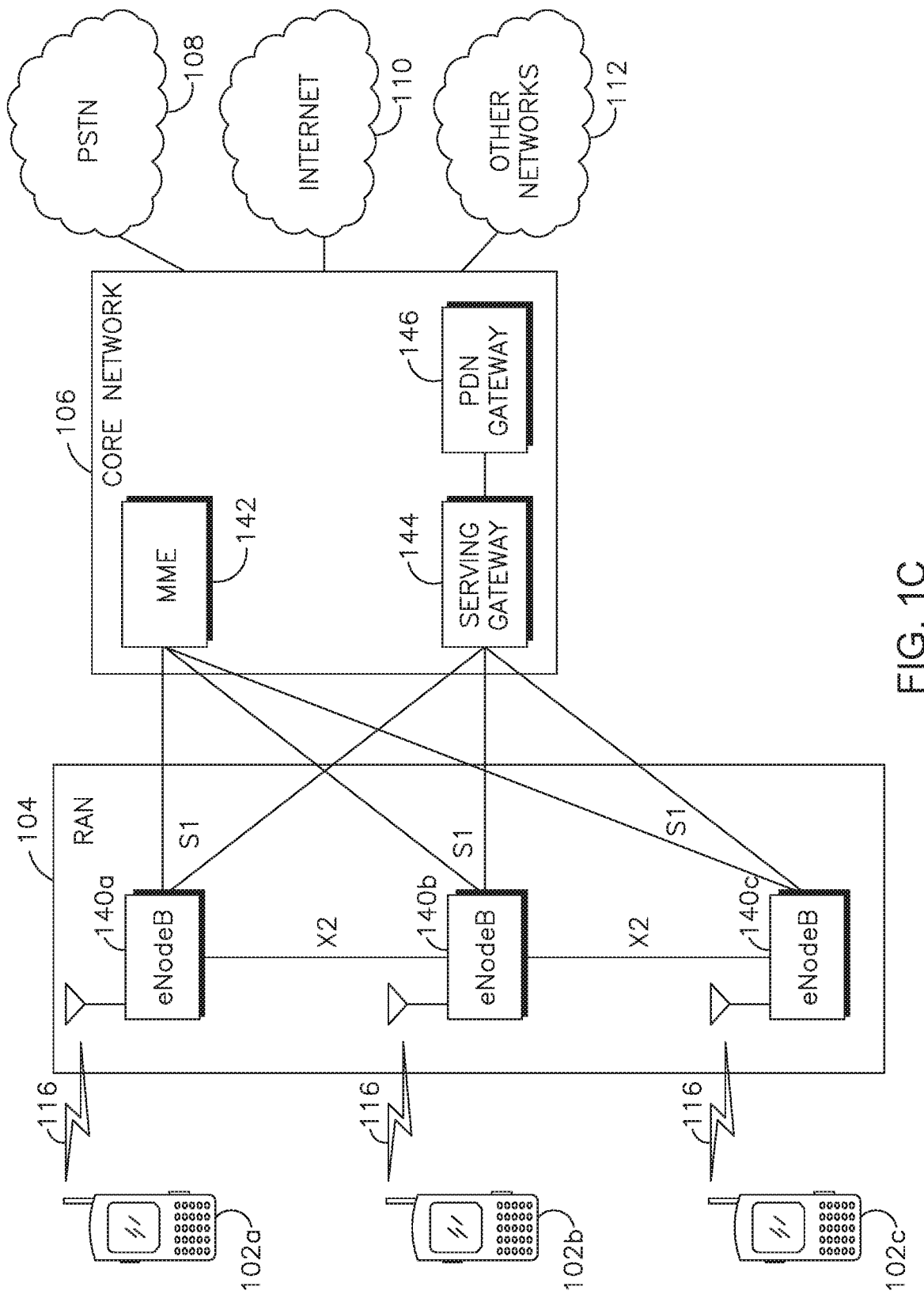
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Figure 10:
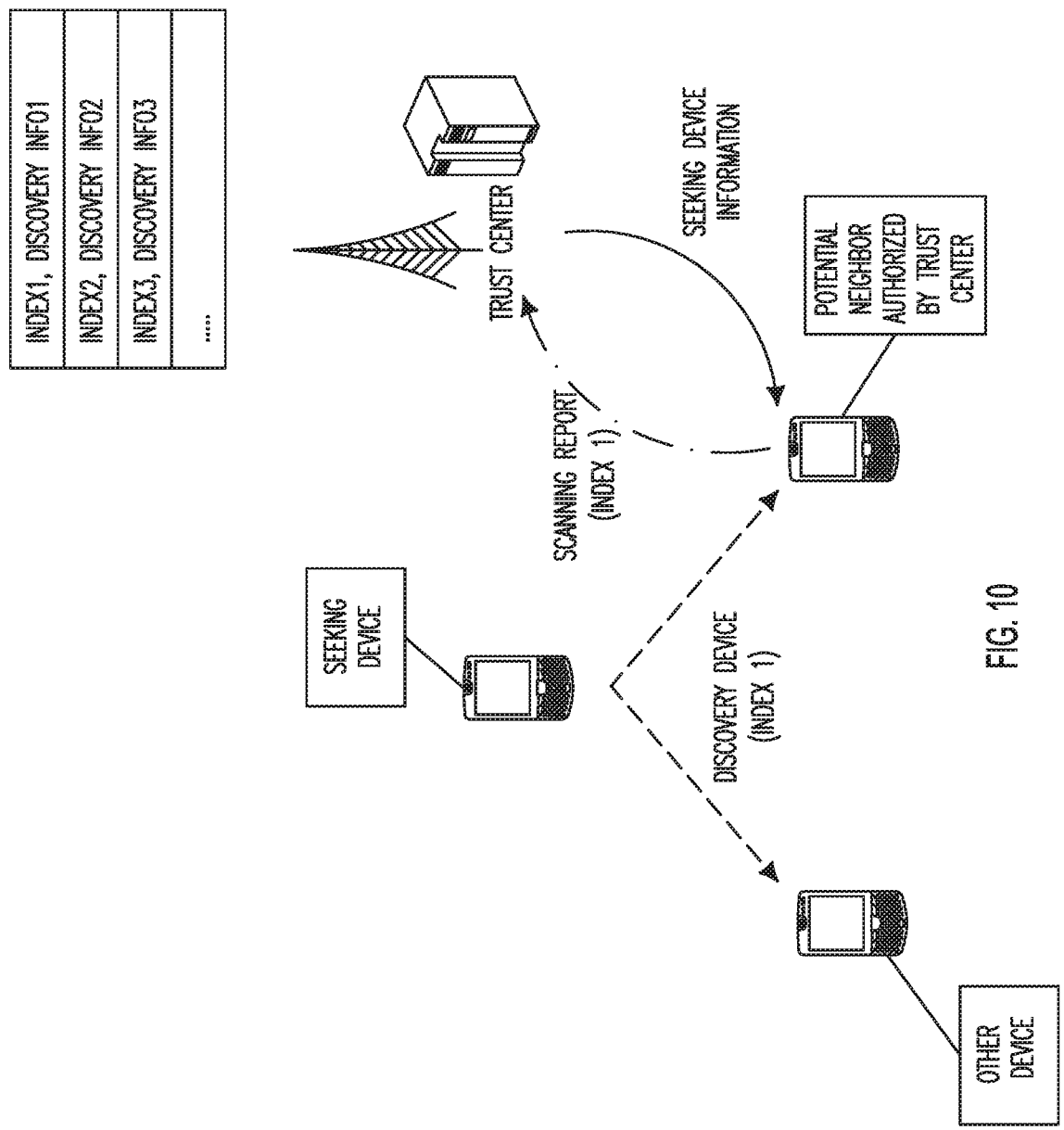
FIG. 10 shows an example of seeking device anonymity preservation.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 10, the eNBs 140a, 140b, 140c may communicate with one another over an X2 interface.

The core network 106 shown in FIG. 10 may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The attention that proximity services (ProSe) have been receiving from the cellular technology ecosystem has been increasing. ProSe may rely on the proximity between two or more devices, (e.g., wireless transmit/receive units (WTRUs), user equipment (UEs), mobile stations), and allow specific commercial and social applications, network offloading, or public safety direct communications.

Other alternatives, such as Wi-Fi or Bluetooth, may allow direct communication between two devices (D2D), but they are working on a license-exempt band, and thus they may be subject to higher interference and lower quality of service (QoS). Moreover, cellular technology may allow network control of D2D communication. This may be particularly advantageous to reduce the scanning time of the devices, and thus their power consumption. However, this may also be advantageous in terms of the link security level offered by a centralized infrastructure. The same resources may be reused for D2D, and the infrastructure mode may be implemented under close control of the level of interference between each mode. Moreover, adding D2D capability to cellular technology may be valuable for public safety applications. The same technology may be used for local calls in direct or D2D mode, (such as what is available with terrestrial trunked radio (TETRA) today), but may also allow access to the national cellular network with the same equipment. This may generate economies of scale. The close integration of both capabilities may improve response time and coordination in case of major disasters.

ProSe may require D2D discovery and communication procedures, whereby each procedure may be used independently from the other. Methods and apparatus using a new D2D discovery function are described herein, whereby one or several monitoring devices may be allowed to identify one or several discoverable devices. This new D2D discovery function may be triggered at the application level or at the network level to ensure discovery service continuity, optimize mapping between service and RF identities, handle priority levels in discovery processes, handle discovery in mobile cases, and handle a discovery procedure involving multiple public land mobile networks (PLMNs).

Hereinafter, the terminology "device" may encompass, without restricting its applicability, any entity such as a wireless transmit/receive unit (WTRU), a user equipment (UE), a mobile device or a network node, any application or user, a client, a network adapter, or any combination thereof. By extension, a device may also encompass, without restricting its applicability, fixed or mobile relays, femtocells, small cells, and home evolved Node-Bs (HeNBs).

Hereinafter, the terminology "network" may refer to any element or function of a wireless network infrastructure that has the capability of controlling transmission and/or reception of devices, (e.g., WTRUs), or which transmits signals used as a reference by such devices. Examples of network elements may include an eNB, an MME, a serving gateway (S-GW), and the like. By extension, a network may also refer to any device that has the capability of a network in a specific context. For example, in some public safety applications, a device may take the role of a network for certain functionalities, such as providing a synchronization reference.

Hereinafter, the terminology "discovery" may refer to a procedure by which a first device may detect a second device.

Hereinafter, the terminology "service discovery" may refer to a procedure by which a device may detect the availability of a service.

Hereinafter, the terminology "RF discovery" may refer to a procedure by which a first device may detect the proximity of a second device based on one or more radio characteristics of the second device. For example the first device may detect a signal transmitted by the second device, or the first device may be informed by the network of the proximity of the second device, (e.g., for proximity at cell level).

Hereinafter, the terminology "RF proximity" may refer to a first device being within the range of a second device. This range may be related to a metric measurement. For example, RF proximity may be detected by the first device based on a measurement on a discovery signal transmitted by the second device, or by an entity in the network that may receive a measurement (or equivalent) performed on a transmission of the second device.

Hereinafter, the terminology "discovery identity" may refer to an identifier that may be used to determine a relationship between a discovery procedure and a requesting device. A discovery identity may be associated to an RF discovery procedure, to a service discovery procedure, or both.

Hereinafter, the terminology "service discovery identity" may refer to a discovery identity associated to a service discovery procedure.

Hereinafter, the terminology "RF discovery identity" may refer to a discovery identity associated to an RF discovery procedure.

Hereinafter, the terminology "discovery signal" may refer to a discovery signal transmitted by a first device. Such a signal may be received by a second device and may be used to detect RF proximity. A discovery signal may include a payload, (e.g., a service discovery identity).

Hereinafter, the terminology "discovery shared channel" or "DISCH" may refer to a logical channel that may contain discovery information.

Hereinafter, the terminology "physical discovery shared channel" or "PDISCH" may refer to a physical channel used for a discovery signal and/or for transmission of a payload. For example, a PDISCH may carry DISCH messages. The terms DISCH and PDISCH may be used interchangeably.

Hereinafter, the terminology "discoverable service" may refer to a service that may be detected by another device, (e.g., a WTRU, or an application), using a service discovery procedure.

Hereinafter, the terminology "detectable device" may refer to a device, (e.g., a second WTRU), that may be detected by another device, (e.g., a first WTRU), using an RF discovery procedure.

Hereinafter, the terminology "discoverable device", "discoverable WTRU", or "probing device" may refer to a device that may be discoverable by advertising a service, (i.e., the device may have at least one discoverable service), by transmitting a discovery signal, (i.e., a detectable device), or both in combination. A discoverable device may thus be a device that transmits a discovery signal and/or that requests the transmission of at least a discovery identity on a DISCH, (e.g., broadcasted by the network), and/or that performs the transmission of at least a discovery identity on a DISCH. A discoverable device may also be referred to as a probing device.

Hereinafter, the terminology "seeking device" or "seeking WTRU" may refer to a device initiating a discovery procedure.

Hereinafter, the terminology "monitoring device", "monitoring WTRU", or "scanning device" may refer to a device that actively searches for a service, for another device, or for both. For example, a monitoring device may monitor for a discovery signal and/or for a discovery identity in a given resource in time/frequency and/or on a DISCH. A monitoring device may also be referred to as a potential neighbor herein.

Hereinafter, the terminology "discovery server" may refer to an entity that implements functions related to the management of discovery procedures. This may, for example, be a node in the network or a node in a radio access network (RAN).

Hereinafter, the terminology "discovery area" may refer to a geographical area for which discovery procedures may be managed by a discovery server. This may correspond to a cell, a group of cells, a tracking area (TA), a portion of a TA, and the like.

Hereinafter, the terminology "service proximity" may refer to a first device that is in the same discovery area as a second device.

Hereinafter, the terminology "subscribed service(s)" may refer to a set of one or more discovery identities that may be a candidate for a discovery process.

Hereinafter, the terminology "private service(s)" may refer to a set of one or more discovery identities, each restricted to a set of monitoring devices that have the proper credentials to access the concerned service(s).

Service discovery procedures and apparatus are described herein. A service discovery procedure may be implemented by a first device detecting the availability of a second device based on a characteristic of a service. Such characteristics may include, but are not limited to, for example, a service discovery identity as described herein.

A service may include, but is not limited to, a network procedure. This may, for example, be a procedure for RF discovery between two or more devices, the establishment of a direct data transfer between two or more devices, whereby the devices may subsequently transmit communication signals directly to each other, or a local path optimization where data may be exchanged between a plurality of devices without the data necessarily propagating beyond a serving eNB, or more generally beyond the RAN. It also may include a procedure by which a device determines a service area, and then reports the service area to a coordinating entity in the network.

A service may include, but is not limited to, an application. This may, for example, be a social networking application such as Facebook or Google Circles, commercial applications such as Foursquare or advertisement services, multimedia distributions including local media streaming, or direct payment services.

A service may include, but is not limited to, a user, (e.g., userA@application.com, and the like).

A service may include, but is not limited to, a relationship, (e.g., a "friendship", a commercial contract, and the like).

A service may also be associated with a service type. For example, a service may be a coordinating function, a radio access service, a social networking service, a public safety service, a closed group service, an open service, a unidirectional service (e.g., broadcast), an interactive (e.g., bi-directional, multicast) service, or a combination thereof. The service may be hosted by another device in the same or different RAN and/or PLMN. The other device may or may not be within RF proximity.

RF discovery procedures and apparatus are described herein. In an RF discovery procedure, a first device may detect the proximity of a second device based on at least one radio characteristic of the concerned device. For example, the first device may detect a signal transmitted by the second device, or the first device may be informed by the network of the proximity of the second device, (e.g., at cell level). One such characteristic may be a metric, (reference signal received power (RSRP), reference signal received quality (RSRQ), and the like), applied to a discovery signal. The second device may be connected to the same or different RAN and/or PLMN.

The determination of proximity in RF discovery may be performed by a first device that received a discovery signal transmitted by a second device. The determination of proximity in RF discovery may be performed by a network entity, such as a discovery server or an eNB, based on at least one report provided by a device that received a discovery signal. The determination of proximity in RF discovery may be performed by a first device that has previously transmitted at least one discovery signal, based on at least one report provided by a second device that received at least one discovery signal. The report may be sent to the first device either through relaying by the network, or directly through a D2D transport channel.

An RF discovery procedure may be initiated by a device. In this case, the device may request resources for transmission of a discovery signal from the network. Alternatively, an RF discovery procedure may be initiated by a network entity. At least a first device may be provided with resources by the network for transmission of a discovery signal. At least one other device may also receive the same resource allocation, such that the other device may receive the discovery signal from the first device. In this case, devices that have the necessary credentials, (e.g., are allowed to detect the first device), may be provided with the concerned resource allocation. Such signaling may be contained in a radio resource control (RRC) message, in a medium access control (MAC) control element, in a dynamic physical downlink control channel (PDCCH) message, on a logical channel (e.g., a DISCH) specific to this purpose, or broadcasted system information (system information blocks (SIBs)). The network may also provide a measurement configuration to the other devices to enable reporting of measurements performed on the discovery signal.

Discovery pre-selection methods and apparatuses are described herein. Discovery pre-selection may refer to a procedure or set of procedures used for determining if or when an RF discovery procedure may be initiated between two devices. The pre-selection may be based on knowledge of the approximate geographical location of a service or device, for instance based on the serving cell or TA of a device. Pre-selection may ensure that network resources and/or device battery resources are used in an efficient way. Pre-selection may be performed by the network or by a device, as described herein. Pre-selection may or may not be performed by the same entity that initiates an RF discovery procedure, or determines proximity.

In some solutions, discovery pre-selection may be performed by a network entity such as a discovery server. The discovery server functionality may be located in an eNB, MME, or another location in the network. In this case, the network entity may maintain a list of discovery identities corresponding to devices that are known to be under a certain geographic area controlled by the network entity, (e.g., a discovery area), as well as the approximate locations of the devices. Pre-selection may be achieved by verifying if a first discovery identity in the list corresponds to a discoverable service of a second discovery identity in the list, and the approximate device locations are sufficiently close. A discoverable service may be a device or service that may be detected and/or allowed to be detected by another device using a service discovery procedure.

Methods that allow the network entity to maintain the list of discovery identities under a certain geographic area may include, but are not limited to, a device moving into an area controlled by the network entity that may provide its discovery identity and its approximate location to the network entity such that it is added to the list. The device may provide the information via a non-access stratum (NAS) or RRC message periodically, or upon moving into a defined service area or changing defined service areas.

Methods that allow the network entity to maintain the list of discovery identities under a certain geographic area may include, but are not limited to, device moving out of an area controlled by the network entity that may provide its discovery identity and its approximate location to the network entity such that it is removed from the list. The device may provide the information via a NAS or RRC message periodically, or upon moving out a defined service area.

Methods that allow the network entity to maintain the list of discovery identities under a certain geographic area may include, but are not limited to, the discovery server being notified by another network entity, (e.g., an MME or an eNB), when the approximate location of a device corresponding to a certain discovery identity changes, (or when the device changes an RCC or evolved packet system (EPS) mobility management (EMM) state).

Methods that allow the network entity to maintain the list of discovery identities under a certain geographic area may include, but are not limited to a discovery server that may notify a network entity or indicate to a network entity, (e.g., eNB or MME), whenever it detects that at least a second device with a discovery identity corresponding to a discoverable service is in the same approximate location as a first device. The discovery server may notify a first and/or the second device when it detects that a second device with a discovery identity corresponding to a discoverable service is in the same approximate location as the first device. The network entity may initiate an RF discovery procedure.

Discovery pre-selection may be performed by a device. In order to support device-based pre-selection, the device may provide its approximate location to an application server managing its discovery identity and discoverable services through any communication means possible with the application server. The device may provide the information periodically, or upon change of approximate location corresponding to a network defined service area. The application server may notify a first and/or the second device when it detects that a second device with a discovery identity corresponding to a discoverable service is in the same approximate location as the first device.

A device may initiate an RF discovery procedure, or notify the network that an RF discovery procedure may be initiated. The device may indicate its discovery identity and the identity of the device corresponding to the discoverable service to the network, (e.g., through NAS or RRC signaling).

An identity may be associated with a service discovery and/or to an RF discovery. For example, in a network-based approach, an identity associated to a service discovery may consist of an identity known at the network level, such as a globally unique temporary identity (GUTI), international mobile subscriber identity (IMSI), packet temporary mobile subscriber identity (P-TMSI), and the like. From an end-user perspective, an identity may correspond to a phone number, an email address, or an application-specific identity.

The identity may be structured as the combination of a plurality of aspects. For example, such aspects may include a service and/or device category, type, priority, accessibility, and/or access rights, or using other similar principles, (e.g., a service identity may be constructed using the form <application identifier+application-specific identifier>, and an RF identity may be constructed using the form <device category+type of service+required access rights>).

Security mechanisms may be applied on at least part of an identity. Encryption may be applied on at least part of an identity for confidentiality, such that only a receiver with the associated security context may correctly interpret the identity. Similarly, authentication may be applied on at least part of an identity for integrity verification, such that only a receiver with the associated security context may verify correct interpretation of the identity. A cyclic redundancy check (CRC) may be one aspect of the identity, such that a receiver may verify correctness of the received identity, such as when scrambling is applied on the identity, (e.g., for an RF discovery identity).

Filtering may be applied as a function of one or more such aspects. For example, the network may apply filtering upon reception of a request including a discovery request from another device. Filtering may also be applied based on access rights, (e.g., to allow some applications while limiting discovery for others (private services)). Filtering may further be applied based on priority, (e.g., to limit the additional load in a cell due to discovery).

The network may discard a signal or a message (e.g. a discovery request) with lower priority when the resources available for discovery procedures are below a certain threshold. A device may apply filtering during a discovery procedure based on the type of service upon reception of a discovery identity, such as to limit the scope of potential candidates before initiating a request for a service. The device may discard and/or ignore an identity with a type that differs from the type the device is interested in. In yet another example, a device may discard and/or ignore an identity if it failed either authentication, CRC verification, or both.

The identity may be shared by a plurality of users of the same application. For example, devices of the same cell may use a common identity in case the service is related to a radio access technology (RAT) application, such that a given device may discover or be discoverable by a plurality of other devices. In yet another example, different instances of the same application may have the same identity to represent a service that is identical for each instance, (e.g., "is connected with UserB").

The identity may consist of at least one common part and at least one dedicated part. For example, the common part of an identity may be associated with a cell, location area (LA), TA, service discovery area, PLMN and/or device proximity area. If the common part is associated with a cell, all devices in the same cell may share the same common part of the identity. The common part may also correspond to an application, service, and the like. The device may have a plurality of common parts in its identity, (e.g., a cell identity part and an application/service identity part). The dedicated part of the identity may be associated to a unique user, or may be associated to a group, application, or service. For example, the common part of the identity associated to a location, (e.g., cell, TA, or device proximity area), may be used by the application server or D2D server to identify at least a pair of devices in the same area, and may therefore be eligible for an RF proximity procedure. The identity may be provided to the application server or the D2D server upon change of location area or upon change of the service identity by either the device or a network entity.

The device may autonomously update its service identity when moving from one area to another, (e.g., from one cell to another cell). For example, the device may append the common cell identity part to the dedicated identity to construct a service identity. The network may also perform the same. Alternatively, the service identity may be explicitly updated by the network and/or by the application.

The identity may be associated with an expiration time, (or time of validity). For example, a device may store one or more identity that it may be interested in; the identity may be associated with a validity period. The device may perform a request for discovery, and repeat the request when it does not receive a response for the identity for a period that may not exceed the validity period for the concerned identity. The device identity may also be valid within a given area, (e.g., a cell, a TA, a routing area (RA), a discovery area, and/or a proximity area). An identity may be valid for the duration of the connectivity within a cell. Once the device changes cells, (e.g., a handover takes place), and/or the device changes LA, RA or TA, the identity or part of the identity may no longer be valid.

The discovery ID may be selected from a set of options available for the selection, also referred to as "selection rules." The selection rules may be pre-configured in the WTRU, or provided by the network. The selection rules may be provided to the WTRU by the eNB using unicast or broadcast signaling. Alternatively, the selection rules may be configured in the WTRU by a core network entity, (e.g., MME or the ProSe function). The selection rules may be configured in the WTRU using application layer signaling or Open Mobile Alliance (OMA). The selection rules may provide criteria for choosing an identifier for transmission, or filtering an identifier during reception. The criteria may include a type of discovery, whereby a set of identifiers may be used for open discovery or restricted discovery. The criteria may include an application ID, whereby a set of identifiers may be allowed for a particular application. The criteria may include targeted versus non-targeted discovery, whereby a set of identifiers may be allocated for targeted discovery. The criteria may include a proximity range, whereby a set of identifiers may be allocated for a range, (e.g., small, medium, large). For example, if the discovery is configured for a large range, the WTRU may select an identifier from the set allocated for large area transmission. The selection rules may be associated with other parameters to define how the identifiers may be used for transmission or reception. For example, a rule may include the power used for transmission of a set of identifiers, the transmission occasion, the reception window, and the like.

A service discovery identity may be associated with a service. The service discovery identity may be used by procedures described herein to determine what device is either interested in, offering, participating or making available, the concerned service.

The service discovery identity may be generated by a control function, (e.g., NAS or RRC). For example, the network may assign an identity for the concerned application. The device may receive an identity using, for example, an RRC procedure or a NAS procedure.

The service discovery identity may be generated by an application, (e.g., Facebook, FourSquare, or the like). The application may manage a set of identities, which may be assigned to a service as described herein. The application may transfer identities between different instances of the said application. For example, an application such as Facebook may assign an identity to a first users relationship, (e.g., John's friends), provide the identity to one or more other users associated with the relationship, (e.g., to some or all of John's friends), and associate the identity to a service discovery process, whereby any of the other users may discover the first user. Scheduling in time (e.g., in absolute time) for the start of the discovery as well as a validity period, (e.g., as an absolute expiration time), for the discovery procedure may also be provided together with the identity. An application programming interface (API) between the device and the concerned application may be used to exchange information related to the identity, including the identity itself.

The service discovery identity may be generated by a client using, for example, a request to a centralized server, which may be operator controlled, and/or reside anywhere in an Internet protocol (IP) network. The request may be made using protocols similar to dynamic host configuration protocol (DHCP), simple object access protocol (SOAP), universal plug and play (UPnP), and the like.

The service discovery identity may include, but is not limited to, a numerical value, (e.g., hexadecimal number). Different parts of the identity may be assigned to different aspects of the identity. For example, different ranges or groups of values may be assigned to different aspects of the identity.

The service discovery identity may include, but is not limited to, a service name (e.g., a string). A hierarchical naming system similar to the domain name system (DNS) structure may be used such as, for example, of the form <InstanceID.ServiceType.Domain> or <ApplicationID:: ConnectionID>. Each element of the service name may be further associated with a numerical value.

The service discovery identity may include, but is not limited to, a uniform resource identifier (URI), (e.g., UserA@application.com).

The service discovery identity may include, but is not limited to, a structured list of elements, (e.g., using a markup language such as extensible markup language (XML)).

The service discovery identity may include, but is not limited to, an identity derived from a plurality of identities. The identity may be constructed by combining one or more of, for example, a type identifier (ID), a service ID, a device ID, an operator ID, a user ID, and the like.

The service discovery identity may include, but is not limited to, an RF discovery identity, or a value derived thereof.

The service discovery identity may include, but is not limited to, a reference or an index to any of the above.

Combinations of the above are also possible. In particular, the identity may include location information, (e.g., cell identity, neighbor cell identities, PLMN, discovery area identity, and the like). A device may determine whether or not it is interested in the service based on such location information. This may also be used to perform pre-selection by the network.

Once the service identity is no longer valid, any parameters, (such as an RF identity), associated with the identity may be revoked. For example, a URI corresponding to a user and an application, (e.g., john@m.facebook.com), may be combined with an RF discovery identity, (e.g., an index to a physical resource), with a service type (e.g., "discoverable") and access rights (e.g., "friends") using XML. It may also include location information. It may also include scheduling in time (in absolute time) for the start of the discovery as well as a validity period (as an absolute expiration time) for the discovery procedure.

An RF discovery identity may be associated with a device. The RF discovery identity may be further used by procedures described herein to determine what device is in proximity, or whether or not a given device is in proximity.

The RF discovery identity may be generated by a radio control function, (e.g., NAS or RRC). The network may assign an identity to a given device. The device may receive an identity using, for example, an RRC procedure or a NAS procedure.

The RF discovery identity may be generated by a client using, for example, a request to a centralized server. Such servers may be operator controlled. The request may be made using RRC or NAS protocols.

The RF discovery identity may include, but is not limited to, an index to a physical resource, a physical resource in time and/or frequency and/or space, or a scrambling sequence, (e.g., initialized using a function of an associated service discovery identity). The scrambling sequence may be applied on a transmission that is used as an RF discovery signal. The scrambling sequence may be applied to a transmission for a PDISCH. The RF discovery identity may further include, but is not limited to, a numerical value (e.g., hexadecimal number) or a service discovery identity, (e.g., as a payload of an RF discovery signal), a CRC, or a reference or an index to any of the above. Once the RF discovery identity is no longer valid, any parameters (such as a radio resource) associated with the identity may be revoked and no longer available to the concerned device.

The device may associate a priority to a discovery procedure. Such priority may be based on a QoS class associated to the corresponding process. Alternatively, a discovery process may be associated with a discovery class.

A device may use such discovery classes to enforce a priority between different types of services or between types of transmissions (e.g., between transmission related to an RF discovery procedure and a network-based transmission).

A device may be assigned a power discovery class, which may indicate a maximum power level. The power discovery class may limit the device's access to a range of discovery classes, (e.g., a device with power class 3 may not be able to access discovery classes 5 to 7). The power class may refer to a maximum discovery range (e.g., 200 meters). For example, three different levels of a power discovery class may be designated based on a maximum range for RF discovery, (e.g., 50 meters, 200 meters, and 500 meters, respectively). This may be related to the maximum transmit (Tx) power allowed for a corresponding RF discovery signal.

A discovery class may be based on a type of service. One service type that corresponds to a public service application may have a higher priority than another service type that corresponds to a commercial application. For example, an emergency signal or a discovery process initiated by a medical device may be designated by a higher value than a process that advertises restaurants in the vicinity of the device.

A discovery class may be based on a subscriber profile. For example, a device that corresponds to a subscriber that supports a public safety application may have corresponding services of a higher priority class.

A discovery class may be based on a device category. A discovery class may be associated with minimum latency requirements. The device category may limit the access to certain discovery classes.

A discovery class may be based on device status. In a public safety deployment, a device taking on the master role in a cluster may be assigned a privileged discovery class.

The use of discovery classes may be applied to scheduling of resources, (the discovery class may translate into a QoS class indicator (QCI)). This may impact the discovery signal parameters, (contention-free vs. contention-based, repetition, bandwidth, and the like).

A discovery class may be based on preemption between different requests, (e.g., release of an ongoing but not yet complete existing process in favor of the initiation of a new process that corresponds to a new request).

A discovery class may be based on prioritization with network communications, discovery process release strategies, (e.g., time-out values may be related to discovery classes).

Discovery classes may be assigned during the discovery service registration. They may be associated with different charging values. A device may use different discovery classes depending on the type of discovery process it requests. Some classes may be compatible with RRC_IDLE mode while others may be not.

In a dedicated discovery use case, a subset of devices (i.e., potential neighbors) may be indicated in the discovery request. The notion of potential neighbors may be very large and may, for example, refer to all devices attached to a cell. For example, this set may be provided by an EPS after a specific request from one device. In a blind discovery use case, there may not be a potential neighbor indication.

A symmetric discovery class may be designated for different devices involved in a discovery procedure that desire to be discoverable.

An asymmetric discovery class may be designated when at least one device involved in a discovery procedure may not desire to be discoverable.

An open discovery class may be applicable for devices that may be discovered at any time without prior authorization, (subject to initial operator and user settings).

A restricted discovery class may be applicable where a prior authorization from a user or application may be required before any discovery process. If the discovery procedure is authorized at the application level, then the information on neighbor devices may be restricted to a particular application and not to other applications run by the same user.

The discovery procedure may be initiated before (a priori procedure) or after (a posteriori procedure) communication between two or more devices takes place. The devices may originate from one or several PLMNs. This procedure may be applied by the network independently from the application. In this case, the application may not know that the two devices are neighbors. The discovery gain (and eventually the communication gain) may improve performances from the network perspective, (e.g., D2D communications may decrease the network traffic load). The application may directly call the discovery procedure, and the discovery gain may be achieved on the application itself, as well as on the network performances.

The discovery procedure may be particularly adapted to commercial/social use, network offloading, and public safety. The discovery procedure may apply to devices under the network coverage, but also in the public safety case to one or several devices out of network coverage. The discovery procedure may also be part of a call procedure in public safety applications, (e.g., push-to-talk applications).

Methods and apparatus for configuration of the discovery process are described herein. The discovery procedure configuration may be performed by the network to configure the device to initiate/terminate or reconfigure device discovery process. The discovery process may be explicitly triggered (start/stop/interrupted) by network configuration, application or device events. The network based events may be triggered when the network detects that a particular device is out-of-service or reporting degrading link conditions. The network may initiate the discovery process for all capable devices in the vicinity to start the discovery procedure. The network based events may be triggered from an external application server or application entity. The network based events may be triggered in response to congestion. The network may configure the device to seek neighbors to initiate offloading. The network based events may be triggered if the network determines a data plane connection is between two devices that are part of the same IP network or geographical location.

The device-based events may be triggered by the device detecting that it is out-of-service or reporting degrading link conditions. The device may autonomously initiate moving to listening (reception) mode in order to look for any discovery signals from neighboring devices. The decision to autonomously start listening mode may be based on a previous explicit configuration or a policy based configuration.

The device-based events may be triggered by applications running on the device. The device may initiate a session with a destination device in the same IP network, (this information may have been exchanged at the application level).

The device may initiate a session with the destination device in the same geographical location, (e.g., application exchanges, global positioning system (GPS) coordinates and triggers the device's non-access stratum (NAS)/access stratum (AS) to initiate direct discovery).

The discovery process configuration may include a configuration of a discovery mode, the policies associated with discovery, the resource configuration, and the rules for starting, stopping, and measuring the discovery transmissions.

The discovery process configuration may include configuration of discovery mode, the policies associated with discovery, the resource configuration, and the rules for starting, stopping, and measuring the discovery transmissions. The discovery process configuration may include a discovery signal resource configuration, whereby discovery resources may be configured by the network with a validity area, (e.g., discovery resources may be configured for the entire network or for a discovery area or for a cell). Depending on this validity area, a device may be configured to reacquire discovery resources when it handovers from one area to the other.

The discovery process configuration may include beacon transmission periodicity information, and discovery mode of operation information indicating, but not limited to, listening only, transmitting only, or alternate listening and transmitting periods. The discovery mode of operation information may also indicate if broadcast or dedicated signaling may be used for the discovery process.

A device may be configured by the network so that when it starts to monitor a discovery identity, either the device may decode a broadcast channel to check if a discovery identity is advertised in the discovery area, or the device may transmit dedicated signaling to the network to announce that it monitors a discovery identity. A device may be configured by the network to reacquire discovery resources either by decoding a broadcast channel where discovery resources may be indicated, or by using dedicated signaling.

The discovery process configuration may include duty cycle of transmission information, reception information, or a combination of the two. The discovery process configuration may include measurement configuration information for the discovery signaling.

The device may be configured with configuration information at different times including, but not limited to, when the device may first attach to the network; when the device may enter a cell or may connect to the cell the first time, (e.g., upon RRC reconfiguration with or without mobility control information), when the device may perform a service request for D2D communication; and/or after a device discovery request.

The messaging for a discovery configuration may be broadcast for the entire cell using new or existing system information block messages, or using dedicated RRC signaling, MAC signaling, or dedicated NAS signaling.

Different discovery configurations may be indicated for different groups of proximity services in a broadcast channel. For example, a device registered for ProSe services S1 (part of ProSe group G1) and S2 (part of ProSe group G2) may be configured to identify discovery configurations associated to ProSe service group G1 (for S1) and ProSe service group G2 (for S2) through decoding of a broadcast channel. When triggered to run a discovery process for S1, the device may apply a discovery procedure associated to group G1 discovery configuration.

A discovery procedure may be constituted by phases including a discovery process configuration (request/response), a discovery process report, a discovery process modification, and/or a discovery process release. Each phase may be mapped to one or several associated messages. Some phases may be combined or divided in sub-phases. Additional phases may be required to handle mobility as well as discovery processes involving multiple discovery areas or multiple PLMNs.

In the discovery request phase, an entity (device or network) may send a request to another entity (network or device) to start a discovery process.

The request initiator may provide a status parameter. The request initiator may take a 'discoverable' or 'monitoring' status. This role may be defined at the application level prior to the discovery process, based on current device status (battery level, location, receive (Rx) signal-to-interference plus noise ratio (SINR), and the like), and/or a security context.

The request initiator may provide a discovery type parameter. The discovery process may be aimed at RF proximity or only at a service presence in a discovery area. The RF proximity case may involve service detection.

The discovery type may indicate if the discovery procedure is 'open' or 'restricted'. In the 'open' case, any device may be allowed to discover the request initiator. In the 'restricted' case, a device may require explicit permission to discover the request initiator.

The discovery type may indicate if the discovery procedure is 'targeted' or 'non targeted'. In the 'targeted' case, the request initiator may define specific discovery identities to discover. In the 'non targeted' case, the request initiator may not define specific discovery identities to discover and may be open to discover any device in proximity.

The request initiator may provide a reference to a temporary discovery process identifier (T-DPI). This reference may be used to indicate this the request is not new, but instead is a reiteration of a rejected request. For example, this may also be useful when the message includes a report requested by the network.

The request initiator may provide a list of discovery identities. The request initiator may provide the discovery identity list to monitor or advertise. In the monitoring case, the request initiator may also provide its own discovery identity, in which discovery becomes a symmetric procedure. In the discoverable case, the initiator may request to advertise only one part of the discovery identity. It may also provide a set of monitoring devices that have the proper credentials to access the concerned service(s), (this is equivalent to providing an encrypted discovery identity, and to providing the encryption key to a specific set of devices). This list may also be provided in a preliminary phase such as the discovery service registration or update, etc.

The request initiator may provide a time-to-live (TTL) parameter that corresponds to the discovery process duration. It may take an infinite value for static discovery processes (e.g., the advertisement of a public service). Several units may be used for this field, including but not limited to, absolute end time, and duration in time units (subframes, seconds, and the like). The timer may start on the discovery response reception.

The request initiator may provide a maximum number of success/failure/reports. These numbers may be used to release a discovery process. They may be used independently or combined, for example, with the TTL value.

The request initiator may provide a discovery class, as previously described.

The request initiator may provide a security context. Depending on the method used to perform advertisement of a discovery identity, (e.g., on a DISCH broadcasted in a cell or in a group of cells), this identity may be encrypted to preserve confidentiality. In this case, an indication on the encryption key/method to be used may be provided so that an application having the corresponding key would be able to decode the discovery identity.

The request initiator may provide a report on presence of discovery signals. A device may provide an initial report of the discovery signals in its neighborhood (e.g., where their scheduling has been broadcasted). This report may be used by the network to maximize the discovery identity orthogonality to be used in the discovery process The request initiator may provide a passive or active discovery. A passive discovery may indicate that the device may eventually switch to idle mode during the discovery process. This may limit its role to monitoring, but may also be taken into account in the network messaging strategy during the discovery process, (e.g., a message transmitted during paging opportunities, and the like).

The request initiator may provide a release trigger option. The discovery process release trigger may be indicated in the discovery request and based on at least one of maximum number of success/failure/reports, TTL, and an explicit discovery release message sent by the initiator.

In the case of a multi-PLMN discovery, the parameters may be added to the request including but not limited to target PLMN(s), where the request initiator may provide one or several target PLMN identifier(s) where the monitored discovery identities are known to be located; and device identifier(s) associated with the monitored discovery identity (e.g., phone numbers, and the like).

After the transmission of a discovery request message, a device may store the T-DPI for future reference, start a timer associated to this discovery request, and/or monitor the discovery response on the corresponding channel In the discovery response phase, the network may provide its answer to a discovery request transmitted by a device. The network may accept or reject the discovery request.

In the accept case, the network may provide a discovery process identifier (DPI), (a unique identifier used to refer to this process in any messaging (discovery report, release, and the like).

In the accept case, the network may provide a dedicated discovery RNTI that is dedicated to the discovery process. In some cases, the same RNTI may be used for different discovery processes (e.g., a multicast discovery).

In the accept case, the network may provide an initial report. In the monitoring case, the network may directly provide in its response a list of discoverable discovery identities related to the request. For example, if the request is aimed at a discovery group identity, the network may provide in its response the current discovery identities that are part of this group and present in the discovery area. If the monitoring device does not have the credentials for this discoverable device, the report may simply not list it. In the discoverable case, the network may directly provide in its response a list of service identities already monitoring the discovery identity.

In the accept case, the network may provide DISCH parameters. The network may provide the information required to decode the DISCH, such as scheduling, security parameters, and the like.

In the accept case, the network may provide an RF discovery identity. The network may assign one or a group of RF discovery identities associated to an RF discovery procedure that include resource information. These identities may already be used in other ongoing discovery processes.

In the accept case, the network may provide additional parameters associated with the discovery signal, (i.e., not included in the RF discovery identity such as, for example, initial transmit power, and the like).

On the reception of a discovery response (accept) message, a device may monitor the dedicated RNTI in PDCCH, schedule the DISCH reception, start a timer (set to TTL) associated to this discovery process, and start counters (maximum number of success/failure/reports) associated with this discovery process. If a group of RF identities is provided, a unique RF identity may be selected within this group based on device or service parameters. If the scheduling information is included in the RF discovery identity, the discovery signal transmission or reception may be scheduled. The case where the network initiated the discovery request may be addressed similarly.

The network may transmit, in its request, any of the parameters described above.

In the reject case, the network may provide a T-DPI so that a device may refer to this response in a future discovery request attempt.

In the reject case, the network may provide a reject reason. The reason for rejection may include, but is not limited to, a saturated network, a service ID is not allowed on network, a service ID is not available anymore, (e.g., in the case of an RF discovery applied to a service previously identified in the discovery area, the service may have left the discovery area or have experimented a radio link failure), and a need to switch a discoverable/monitoring role.

In the reject case, the network may provide a timer value before the next authorized request. For example, a value of infinity may indicate that the corresponding service is either not allowed, not supported, or not valid for the concerned device in the concerned area, (e.g., cell, discovery area, or PLMN).

In the reject case, the network may provide a report on the presence of discovery signals. The network may request the device to provide a first or additional report on its current neighborhood before accepting a request. This may be particularly useful in the 'discoverable' case where a signal transmission may interfere with other ongoing discovery processes. It may also provide the scheduling information on the discovery zone to analyze.

On the reception of a discovery response (reject) message, a device may transmit a new discovery request including the required report, start a timer for the next request time, store a T-DPI for future reference, and/or report the failure with its cause to an application.

In the discovery reporting phase, an entity (network or device) may send a report to another entity (device or network) on a discovery process.

When the discovery report message is sent by the network, the following parameters may be part of a discovery report message: a list of devices (identified through their RF identity, or through a service identity) monitoring the 'discoverable' discovery identity, a list of monitoring devices having reported the 'discovery identity' discovery, discovery signal measurements associated to each monitoring device, a flag to indicate that the monitored discovery identity is currently discoverable in the discovery area, an RF discovery identity, a security context, a list of filtered discovery candidates, threshold adjustments and/or a flag to indicate the discovery process release.

When the discovery report message is sent by the device, the following parameters may be part of a discovery report message, which may be an indication of when the reporting event may be triggered, (e.g., periodic reporting or event based triggering), the number of devices that may be reported in the reporting message whereby, in case of periodic reporting, the reporting configuration may also include the periodicity), the parameters that may be sent in the report, measurement results on the monitored signals, RF proximity results on the monitored signals, timing issues with the discovery signal and/or a list of potential discovery candidates.

On the reception of a discovery report message, a device may start a timer before sending a new report. If a list of devices monitoring the service identity is received, a device may request a new discovery process to initiate RF discovery. If a monitored service identity becomes discoverable in the discovery area, a device may transmit a new discovery request aimed at RF proximity. If a monitored RF identity becomes discoverable and includes scheduling information, the device may start to monitor the discovery signal. If a monitored RF identity becomes discoverable but does not include scheduling information, the device may start to monitor the related scheduling information. If a flag indicating the discovery process release is on, the device may take the action described in the discovery process release phase.

Additionally, if a list of potential candidates from the monitoring device is received by the network, the network may filter those candidates and transmit a new report to the monitoring device.

In the case where a device is in IDLE mode and is configured to transmit a report, the device may be configured to switch to CONNECTED mode and transmit the report. RF proximity may trigger RRC transition to CONNECTED mode. The device may be configured to delay the report transmission until the next CONNECTED mode transition, (i.e., the discovery procedure does not trigger RRC transition). The device may be configured to stay in IDLE mode and to transmit the report, (e.g., the discovery report may be part of a connection-less approach). In this case, the device may not establish a dedicated S1-U bearer for report transmission. The discovery report may be transmitted in a contention resource, such as a random access channel (RACH), so that report transmission may not interfere with cellular communications.

A device may indicate that at least one element of a discovery process configuration, (e.g., radio resource allocation, discovery identity, discovery area, and the like), is not valid anymore. This indication may be provided through dedicated or broadcast signaling, or timer expiration.

For dedicated signaling, a device may receive such indication through a dedicated radio resource control (RRC) or Internet protocol (IP) signaling. For broadcast signaling, a bit broadcasted in a system information block (SIB) may indicate when devices may have to retrieve at least one element of the discovery configuration. A plurality of bits may be used to provide this indication for different service types, types of discovery, and the like.

For timer expiration, a discovery configuration may be valid for a given duration.

Based on various triggers, a device may be configured to reacquire at least one element of a discovery process configuration, (e.g., radio resource allocation, discovery identity, discovery area, and the like). The device may reacquire those elements through a dedicated request/response, whereby a device may be configured to request discovery configuration reacquisition through RRC or IP signaling. The device may be configured to switch to CONNECTED mode and/or re-establish an RRC connection with a ProSe function. Then, a device may be configured to receive an updated discovery configuration through dedicated RRC or IP signaling. For broadcast signaling, a device may be configured to reacquire discovery configuration through decoding of a broadcast channel.

In the discovery process release phase, a discovery process may be stopped. The process release initiator may be a device or the network. For example, the network may terminate a low priority discovery process in the case of a lack of resources. A device may terminate a discovery process when the application receives the required discovery information or when the application is closed by the user. A device may terminate a discovery process upon receiving a message to terminate the discovery process. A device may terminate a discovery process and clear the discovery process configuration upon change of a D2D proximity area, (e.g., a cell, TA). The network may terminate a discovery process when a device leaves a D2D proximity area The following parameters may be part of a discovery release message: a release reason (e.g., saturated network) and a timer value before a next authorized request.

On the reception of a discovery release message from the network, a device may terminate any signal transmission associated to this discovery process, reset any timer applied to this discovery process, and/or start a timer for the next authorized request time.

A device may assist RF discovery by performing discovery measurements on at least one set of discovery signal measurement resources and reporting the results to the network. The measurement and reporting of discovery measurements may be managed and controlled by the measurement subsystem of the RRC protocol. Alternatively, it may be managed through a logical channel, (e.g., a DISCH). The configuration of the D2D discovery procedure may be used for measuring the discovery signals and the reporting configuration of the discovery procedure.

The measurement configuration may include a set of white-listed devices that a scanning device may consider for reporting, (each configured device may be identified by a cell-specific or area-specific identifier, such as a cell RNTI (C-RNTI) or a system architecture evolved (SAE) temporary mobile subscriber identity (S-TMSI).

The measurement configuration may include a set of black-listed devices that the scanning device may not consider for reporting. The measurement configuration may include a gap configuration or discontinuous transmission (DTX) configuration pattern to be used for the device to perform scanning or measurements to detect discovery signals from neighboring seeking devices. The measurement configuration may include the resources or frequencies the device may monitor to detect neighboring seeking devices.

In case of event-triggered reporting, the reporting configuration from the scanning device may include an absolute and relative event configuration, (i.e., comparing when the discovery signal measurement goes above or below an absolute threshold or relatively compared against measurements from other devices. In case of event-triggered reporting, the reporting configuration from the scanning device may include a configuration to trigger reporting when one or a configured number N of neighboring seeking device(s) are detected. In case of event-triggered reporting, the reporting configuration from the scanning device may include a configuration for reporting performed when an already detected device is no longer detected (e.g., is leaving the configuration). In case of event-triggered reporting, the reporting configuration from the scanning device may include a configuration for when a new device becomes better than an already detected device.

In the case of a device leaving a discovery area "DA1", for another discovery area "DA2", a discovery process may be either transferred to the new discovery area or released. In a discovery process transfer, specific messaging may be used to transfer the discovery information between two discovery servers. The discovery parameters to be transferred may be similar to the initial request parameters with the following modifications applied by the discovery server for DA1: the TTL value may be updated based on the remaining process duration, the current list of devices monitoring the discovery identity may be added to the discovery server for DA1, the current list of monitoring devices having identified the discovery identity may be added to the discovery server for DA1, and an encryption key/method identifier may be added may be added to the discovery server for DA1.

Based on the initial request, the DA2 discovery server may accept or reject the discovery process transfer. In the 'reject' case, the discovery process may be released by the DA1 discovery server before handover completion.

In the discovery process release, the DA1 discovery server may release the discovery process before handover completion, the device may handoff to the new cell, and the device may request a new discovery process to the DA2 discovery server.

In the case where a discovery request involves several PLMNs, the source PLMN may transfer the discovery request to the target PLMN(s). The initial request parameters described above may be included in the transfer message. Some parameters may be added or modified, such as by updating the timer (TTL) and counters. The discovery server may provide a geographical indication that may assist the device(s) tracking in the target PLMN(s).

On the reception of a discovery report message, the following procedure may be used: the target PLMN may track the target device identifier in its network and select the corresponding discovery area, the target PLMN may forward the discovery request to the selected discovery server, the discovery server may accept or reject the discovery request, the target PLMN may transmit the discovery response to the source PLMN, the discovery server may initiate a new discovery process with the target device, the target PLMN may forward the discovery reports and/or discovery scheduling indications to the source PLMN, and/ or the source PLMN may have the responsibility to forward those messages to the corresponding discovery server.

In case of an RF discovery process, the source PLMN may provide a measurement configuration to the monitoring device. This measurement configuration may include a measurement gap and indicate the target PLMN carrier frequency. During the measurement gap, the device may synchronize to the target PLMN signal, decode the current subframe number, and decode the subframe where the discovery signal is scheduled. The device does not need to attach to the target PLMN. At the end of the measurement gap, the device may switch back to the source PLMN and transmit a report to its discovery server. The source PLMN may forward this report to the target PLMN. A discovery process release may be requested by any of the PLMN involved in the process, and may be distributed to the set of involved PLMNs.

Monitoring devices may request a multi-PLMN discovery. A discoverable device may request a single-PLMN discovery. This may simplify the measurement handling, (the device on the visited PLMN may or may not attach as it is only monitoring).

Discoverable and monitoring request procedures initiated by a network are described herein.

The network may initiate a discoverable and monitoring request procedure. This may be performed, for example, after receiving the discovery request from a source. At least one device may be in a discoverable state and at least one device may be in a monitoring state. A device in a discoverable state may transmit at least one discovery signal. A device in a monitoring state may receive or attempt to receive at least one discovery signal. A device may be in both a discoverable state and a monitoring state, whereby it may transmit at least one discovery signal and receive or attempt to receive at least one discovery signal, (e.g., in different resources). A device may be in a "null" state during which it does not transmit or attempt to receive any discovery signal.

Figure 2A:
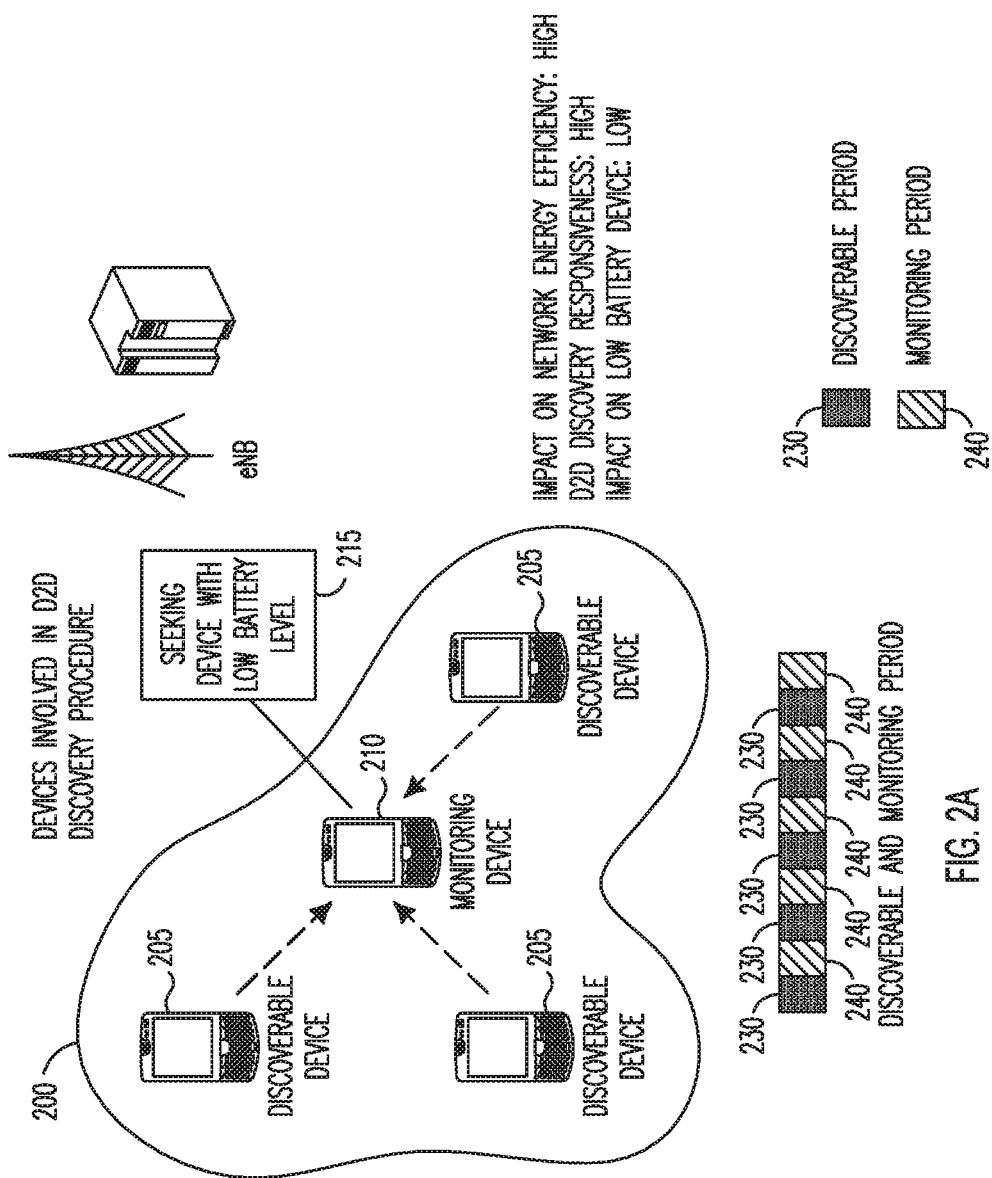
FIGS. 2A and 2B show examples of the discoverable and monitoring state impact on network parameters.
Figure 2B:
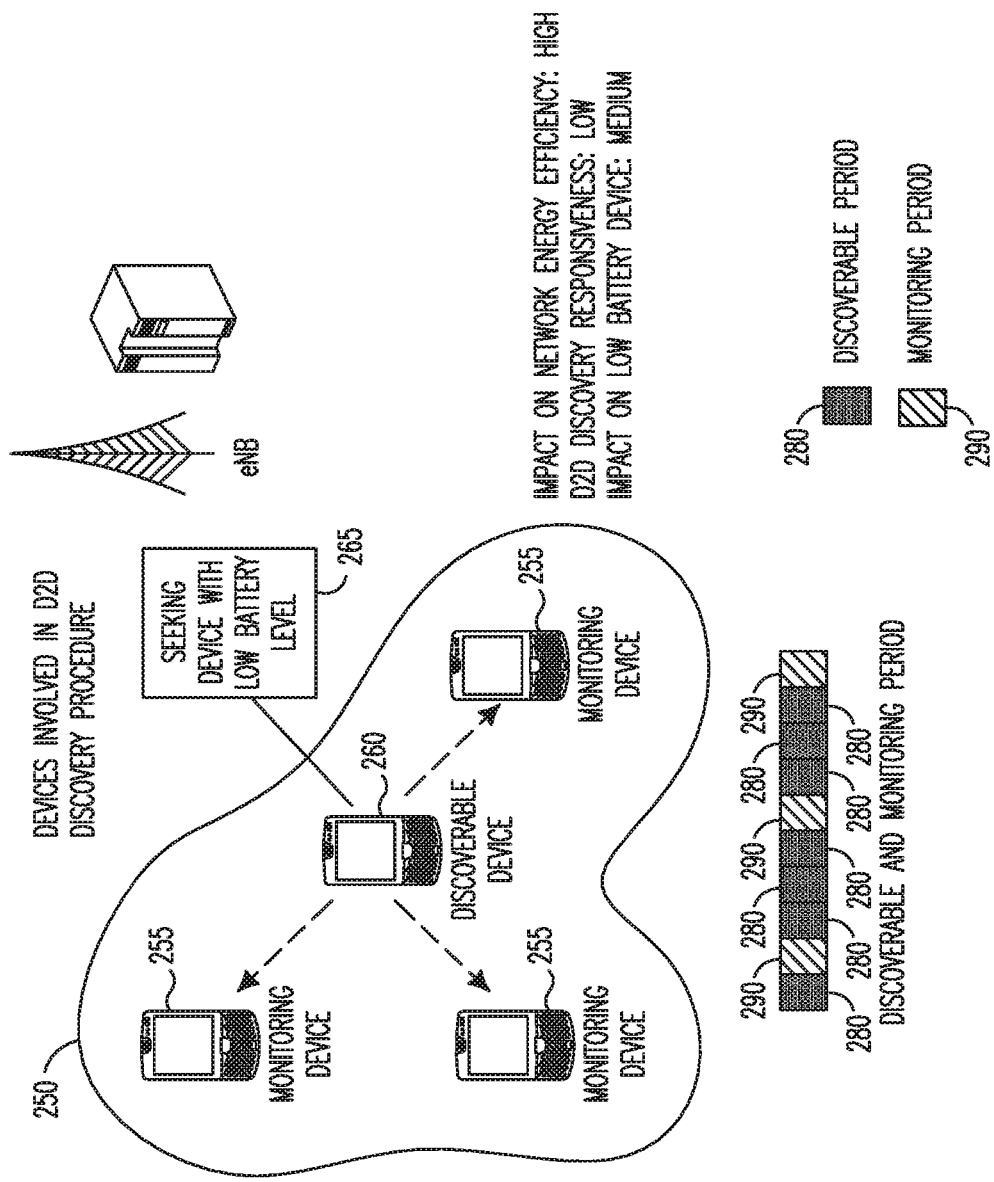

FIG. 2A shows an example of the discoverable and monitoring state impact on parameters for a network 200 including a plurality of discoverable devices 205, a monitoring device 210 and a seeking device 215. FIG. 2B shows an example of the discoverable and monitoring state impact on parameters for a network 250 including a plurality of monitoring devices 255, a discoverable device 260 and a seeking device 265. In a discovery procedure, the discoverable or monitoring state may be independent from the device status, (seeking device or potential neighbor). The seeking devices 215 and 265 may be assigned to a monitoring state, whereby their respective potential neighbor(s) may be assigned to a discoverable state.

As shown in FIGS. 2A and 2B, the selection of the discoverable and monitoring devices may result from a compromise between discovery responsiveness, device battery level, network energy efficiency and capacity. This compromise may be impacted by the network parameters, such as the number of nodes (devices) in the network, their current battery power level, their mobility and the discovery signal bandwidth among others. Thus, the networks 200 and 250 may have access to these metrics to make an optimal decision for a discoverable request. If one metric is not up-to-date, the networks 200 and 250 may request a specific report from one or several nodes, (e.g., based on the battery power level). Based on its current state, the networks 200 and 250 may assign nodes to discoverable, monitoring, communication or idle modes, (in some cases a communication mode may coexist with a discoverable or monitoring mode).

The discoverable and monitoring request messages may be unicast, multicast or broadcast, and may include, but are not limited to, a combination of parameters that indicate whether the device may be in the discoverable or monitoring state, if applicable; channel access mode (contention-based and/or contention-free parameters); resource allocation mode (static, semi-persistent or dynamic (through control channel)); Tx power assignment (e.g., discoverable request); channel resource allocation (specific resource or set of resources); signal index (specific index or set of indexes); Tx timing offset (related to the reference synchronization); trigger to end process (signal acknowledgment, neighborhood identification completed, timer, or single-shot procedure); discovery request parameters (e.g., discovery group identification; initiator such device, network or application; priority, latency requirements, or security parameters); discovery signal synchronization (i.e., does the discovery signal include a synchronization burst/preamble (this burst may be sent on a different channel)); additional discovery signal parameters including but not limited to format, diversity scheme, modulation and coding scheme (MCS); and acknowledgment parameters: channel resource allocation, (the same resource as a discoverable signal with a time offset or a different resource), measurements to be applied (including but not limited to power or timing offset).

This combination of parameters may be different for the discoverable and monitoring requests associated to the same D2D discovery request.

A joint discoverable/monitoring procedure may be implemented rather than using two separate procedures, whereby discoverable and monitoring parameters may be jointly provided, (e.g., in the same downlink control information (DCI)) to the nodes involved in the discovery procedure. As shown in FIGS. 2A and 2B, discoverable periods 230 and 280, and monitoring periods 240 and 290, may be defined for each node. These periods may be specifically defined, (e.g., single or multiple discoverable/monitoring phases may be interleaved). The discoverable/monitoring mode switching may depend on specific events. For example, after a first discovery signal identification, a node may switch from monitoring mode to discoverable mode. The mode switching may be dependent on timers or counters. For example, a node may switch to a discoverable mode as soon as it has no other Tx signal to send, (depending on its network UL schedule). Each time the node transitions to a discoverable state, the node may increment a counter. When the counter limit is reached, the discoverable mode may be terminated. If the neighbor identification fails, a new discoverable request may be sent by the network.

The discoverable/monitoring request initiator may also be responsible to handle its priority. For example, if a new discovery request is received with a higher priority, and the node is already in a discoverable state, then the network may handle a preemption mechanism and terminate the initial discoverable session in a similar manner as the monitoring session associated with this discovery process (at least for this node).

D2D discovery procedure applied to device positioning is described herein. One possible application of D2D discovery may be location and presence service enhancement. The discovery signal and its acknowledgment may be used to compute the round trip time (RTT) between the seeking device and its neighbor. This RTT may be used to compute the distance between the two devices. If the position of any of the two devices is already known, (by any LTE positioning procedures such as an assisted global navigation satellite system (A-GNSS)), then the position of the second device may be estimated. The angle of arrival (AoA) of the discovery signal or the acknowledgment signal may be used to provide directional information for one of the device locations, (the device with the better initial position estimate may be used as a reference).

The above procedures may be combined to obtain an enhanced estimate. Moreover, if more than 2 devices are involved in the D2D discovery, then the estimation may be improved by correlating the information obtained by each device, (e.g., the RTT or AoA computed between three devices may be used to obtain an exact position, as in the usual triangulation or trilateration methods).

A discovery process may interact with RRC connection management. A discovery process may be triggered by signaling by the EUTRAN, or device higher layers, (e.g., NAS, ProSe client, device application layer). In one method, when a discovery process is triggered, it may initiate the device to establish a new RRC connection. In another method, when a discovery process is triggered and the device is designated to be a transmitter of discovery information, the device may initiate a connection establishment. The connection establishment cause may be set to indicate that the reason is ProSe discovery.

The RF discovery may include transmitting and/or receiving an RF message that identifies the parameters associated with the transmitting device. A transmitting device (or announcing device) may transmit an RF discovery message, which may map to any of the following parameters: a device ID, a user ID, an application ID, an application service type and/or a ProSe ID.

A receiver (or monitoring) device may be configured to monitor for RF discovery IDs of interest. When the receiver detects an RF discovery ID that matches a configured signature, the receiver may perform actions described below. The same device may perform the function of announcing and monitoring for a discovery process, or announcing for one discovery process and monitoring for another discovery process, or any combination of the above.

Upon successful detection of an RF discovery ID, the device may initiate an RRC connection request to request to go from RRC_IDLE to RRC_CONNECTED.

Upon successful detection of an RF discovery ID, the device may initiate transmission of a discovery measurement report.

Upon successful detection of an RF discovery ID, if the device is already in RRC_CONNECTED mode, the device may initiate a scheduling request for a grant to send a service discovery message.

Upon successful detection of an RF discovery ID, the device may send a message to the higher layers, (e.g., NAS and/or ProSe client).

Upon successful detection of an RF discovery ID, the device may send a RACH message to the eNB.

Upon successful detection of a service discovery message, the device may initiate an RRC connection request to request to go from RRC_IDLE to RRC_CONNECTED.

Upon successful detection of a service discovery message, the device may initiate transmission of a discovery measurement report.

Upon successful detection of a service discovery message, the device may initiate a scheduling request. The scheduling request configuration may be provided to the device to request a grant for crosslink communication. The purpose of the grant may be to carry a response payload, (e.g., service discovery acknowledgement).

Upon successful detection of a service discovery message, the device may send a message to the higher layers, (e.g., NAS and/or ProSe client).

Upon successful detection of a service discovery message, the device may send a RACH message to the eNB with a request to obtain a grant.

Discovery procedures and related transmissions may impact existing LTE procedures. For example, as a general principle applied herein, it may be desirable to ensure that discovery has the least possible impact to scheduled and/or ongoing transmissions. For example, in cases where resources for discovery may be cell-specific, and triggers may be device-autonomous, (e.g., the network may control the allocation of resources but not the triggers to perform the RF discovery transmission). In such case, the network may not be able to determine exactly whether or not a conflicting situation may occur for a given subframe.

Alternatively, some rules may be needed for exception(s) to this principle, whereby transmissions related to discovery may be prioritized over scheduled and/or ongoing transmissions. One reason for exceptions may include but is not limited to when RF discovery is controlled by the network using dynamic signaling to the concerned device and/or a group of devices, which may be known to the network and include the concerned device. In such cases, the network may have the ability to determine exactly when a conflicting situation may occur for a given subframe.

In one case, a consideration may be where discovery resources may be scheduled per device. In another case, a consideration may be where a set of resources may be scheduled for discovery but the specific resources used by a device in this set may not be known by the network. These considerations are discussed herein in the case of collisions in time (subframe) and/or in frequency (physical resource block (PRB)). For example, all transmissions (e.g., uplink and downlink) of a device (i.e., applied in a device-specific manner) or only if the concerned transmissions may be intended for the same transceiver chain as also applicable for transmissions related to the discovery procedure.

A device which implements a plurality of transceiver chains may perform the network-related LTE physical layer procedures and the discovery-related physical layer procedures independently of one another by using different transceiver chains for each. For example, a device in idle mode, or a device configured for single carrier operation, or a device configured for intra-band contiguous carrier operation, and/or a device configured with a single timing advance groups (TAGs) may dedicate a second transceiver to discovery.

Devices with a different architecture than the above, or more generally, devices that use the same transceiver chain for LTE operation and for discovery operation, may benefit from the behavior described below.

Prioritization between network communications and discovery procedures may consider the following parameters: discovery class, device discovery status (monitoring or discoverable), discovery signal properties (e.g., repetitions, and the like), and device capabilities. A discoverable device may have less flexibility to drop discovery subframes whereby each drop, monitoring devices may be impacted, whereas a drop by a particular monitoring device may only impact its own discovery process.

Based on a discovery class, a device may drop or prioritize the following network communications versus discovery signal transmission/reception. In all cases, the dropping case may be limited to a maximum consecutive or percentage of concerned signaling (the percentage may be specific to the discovery class). These rules may be bypassed if a specific network request is received.

A device may prioritize the hybrid automatic repeat request (HARQ) feedback transmission on a physical uplink control channel (PUCCH) in a subframe scheduled for RF discovery.

A device may prioritize a physical uplink shared channel (PUSCH) (re)transmission in a subframe scheduled for RF discovery. In such cases, it may also prioritize the corresponding scheduling occasion for adaptive retransmissions on a PDCCH in case the concerned subframe is a subframe for RF discovery.

A device may prioritize a dedicated scheduling request (D-SR) on a PUCCH in a subframe scheduled for RF discovery. Alternatively, a device may postpone to the next D-SR occasion in such a case.

A device may prioritize an aperiodic channel state information (CSI) report (channel quality indicator (CQI)/precoding matrix indicator (PMI)/rank indicator (RI) on a PUCCH in a subframe scheduled for RF discovery.

A device may prioritize a periodic CSI report (CQI/PMI/RI) on a PUCCH in a subframe scheduled for RF discovery. Alternatively or additionally, a device may drop the periodic CSI transmission in such cases, (i.e., the prioritization may be a function of whether or not the reporting is periodic or aperiodic).

A device may prioritize an aperiodic sounding reference signal (SRS) transmission in a subframe scheduled for RF discovery. A device may prioritize a periodic SRS transmission in a subframe scheduled for RF discovery. Alternatively, a device may drop the periodic SRS transmission in such cases, (i.e., the prioritization may be a function of whether or not the SRS is periodic or aperiodic).

A device may prioritize a preamble transmission in a physical random access channel (PRACH) dedicated (contention-free) resource in a subframe scheduled for RF discovery. Alternatively or additionally, a device may postpone preamble transmission to the next PRACH occasion in such cases.

A device may prioritize a preamble transmission in a PRACH contention-based resource in a subframe scheduled for RF discovery, (i.e., the prioritization may be a function of whether or not the trigger is device-autonomous or network-controlled).

A device may prioritize transmission that is part of a transmission time interval (TTI) bundle transmission in a subframe scheduled for RF discovery.

The concerned device may determine the RF discovery transmission using signaling that is cell-specific, (i.e., the device may not receive the scheduling information using dedicated signaling, e.g., the network may not be aware). The concerned device may be a monitoring device, (e.g., the network may not be aware).

A discoverable device that receives control information for the RF discovery using dedicated signaling addressed to its C-RNTI (e.g., the network is aware) may instead use converse prioritization for at least one the above transmissions.

A device may prioritize PDCCH reception in a subframe scheduled for RF discovery for a subframe in which control signaling may be received for an ongoing HARQ process for an adaptive retransmission, or a device may prioritize PDCCH decoding for RA-RNTI in an RA response window in a subframe scheduled for RF discovery.

A device may prioritize physical HARQ indicator channel (PHICH) reception in a subframe scheduled for RF discovery.

A device may prioritize paging, a multicast control channel (MCCH) or system information (SI) reception in a subframe scheduled for RF discovery.

A device may prioritize PDSCH reception for a semi-persistent scheduling (SPS) grant in a subframe scheduled for RF discovery.

A device may prioritize multicast traffic channel (MTCH) reception in a subframe scheduled for RF discovery.

The device may suspend the RF discovery procedure if a timer is running (e.g., T310, T311 or T320).

The concerned device may determine the RF discovery transmission using signaling that is cell-specific, (i.e., the device may not receive the scheduling information using dedicated signaling, e.g., the network may not be aware).

The concerned device may be a monitoring device, (e.g., the network may not be aware). Consequently, a discoverable device that receives control information for the RF discovery using dedicated signaling addressed to its C-RNTI (e.g., network is aware) may instead use converse prioritization for at least one of the above transmissions.

In case of a conflict between a DL HARQ feedback and a discovery subframe, a device may use HARQ acknowledgment bundling or multiplexing in the next feedback opportunity. This may require the network to increase the downlink assignment index (DAI) in the corresponding PDCCH.

If HARQ feedback collides with a discovery subframe, the network may increase the DAI in the next feedback opportunity. If the device does not use this discovery subframe, then the device may resend this acknowledgment anyway.

For UL HARQ feedback, a device may receive an additional PHICH in the next feedback opportunity (DL subframe) if there is a collision between a UL HARQ feedback and a discovery subframe.

The network may have various options available to handle scheduling collisions between discovery subframes and network communications.

Figure 3:
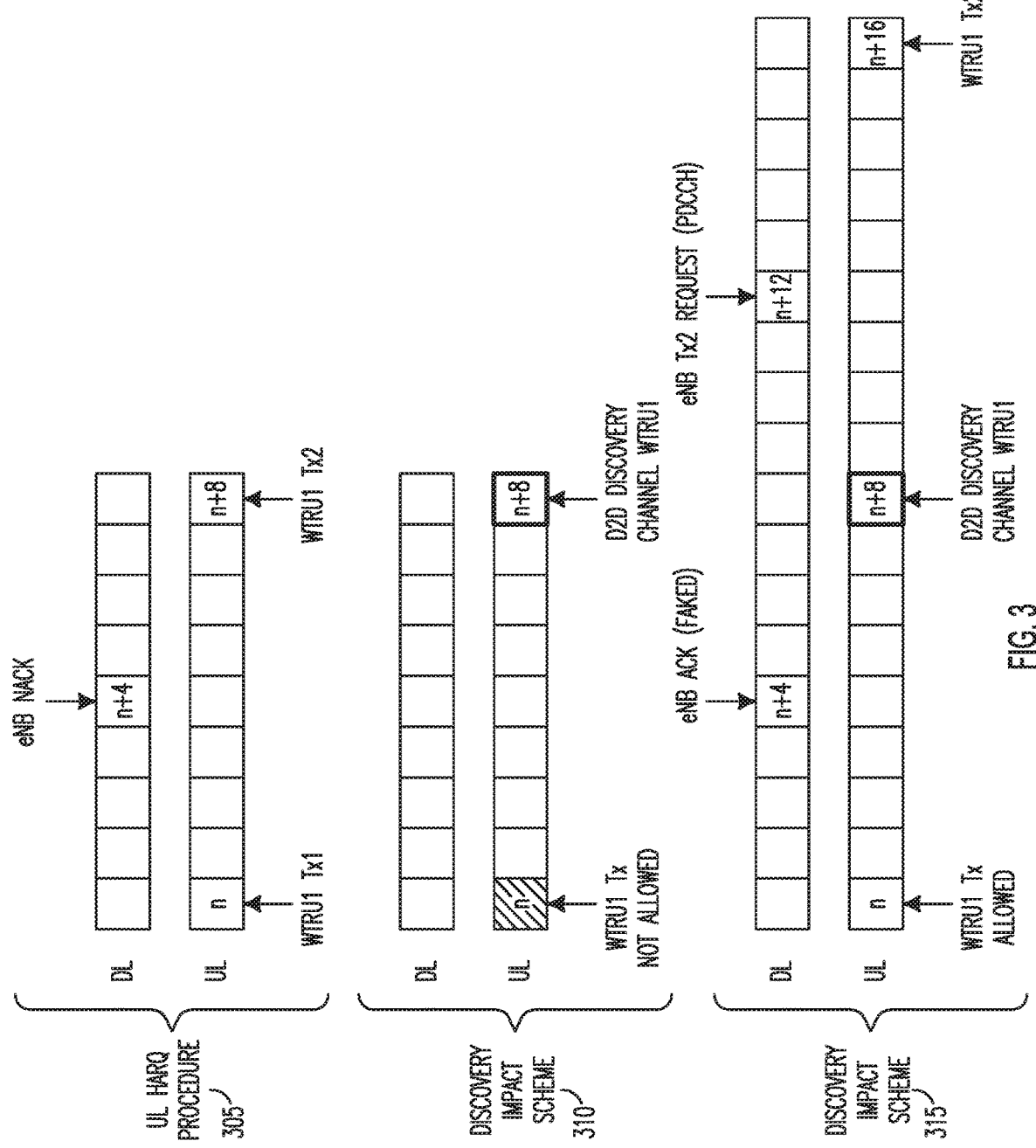
FIG. 3 shows an example of the discovery procedure impact on uplink (UL) hybrid automatic repeat request (HARQ)

FIG. 3 shows an example of the discovery procedure impact on UL HARQ. By performing a UL HARQ procedure 305 of FIG. 3, a discovery resource may be allocated to a discoverable device (WTRU1) on a frequency division duplex (FDD) UL band in subframe n+8. In this case, the discovery process may interfere with an eventual PUSCH retransmission from the discoverable device.

Referring to FIG. 3, WTRU1 may transmit data on a PUSCH channel that is not correctly received by an eNB. At subframe n+4, the eNB may indicate to WTRU1 that the PUSCH was not correctly received by transmitting a negative acknowledgement (NACK) on the control channel. Because WTRU1 may retransmit the data at subframe n+8 in accordance with the LTE standard, a collision with a discovery resource allocation may occur.

In one discovery impact scheme 310 of FIG. 3, the network may restrict a PUSCH allocation to WTRU1 at subframe n (as WTRU1 may not be able to retransmit the message if needed). A Tx/Rx switching gap may be added to the discovery resource to allow a retransmission in the first part of the subframe n and a discovery process in the second part of the subframe n+8. The eNB may restrict the scheduling of WTRU1, (i.e., there may not be a grant that may be allocated to WTRU1 in this subframe), when the eNB is aware that subframe n+8 is scheduled for discovery. In a discovery impact scheme 315 of FIG. 3, discovery resources may be allocated to a discoverable WTRU on FDD UL in subframe n+4 and DL traffic may be allocated to this WTRU at subframe n. The discoverable WTRU may not be able to transmit an ACK in subframe n+4. A (faked) positive acknowledgment (ACK) may be fed back through a PHICH in subframe n+4 and request a retransmission in subframe n+16 through the PDCCH in subframe n+12 as allowed by the LTE standard.

In the discovery impact scheme 315 of FIG. 3, the eNB may acknowledge data in subframe (n+4) even if it has not been correctly received. WTRU1 may use subframe n+8 for discovery. At subframe n+12, the eNB may indicate a new grant to WTRU1 for subframe n+16, and indicate that it is not allocated for a new transmission but instead for retransmission of the data. WTRU1 may the retransmit the data on subframe n+16 and there is no collision with the discovery.

The network may restrict any PDSCH allocation to this WTRU at subframe n, as the WTRU may not be able to retransmit a message if needed. The network may allow a combined acknowledgment and discovery signal, (i.e., require the eNB to properly decode the discovery signal, which may bring additional requirements in terms of transmission power, and the like).

A report transmission schedule may be in conflict with a discovery subframe. The network may allow a combined report and discovery signal, (i.e., require the eNB to properly decode the discovery signal, which may bring additional requirements in terms of transmission power, and the like).

A device may be triggered to send a scheduling request (SR) on a sub-frame that is reserved for ProSe discovery or communication, when there is uplink data available that needs to be sent to the eNB. The device may consider a transmission time interval (TTI) configured as ProSe resources to be unavailable for sending an SR. In case multiple ProSe resources are configured consecutively, the SR-prohit timer may be started at the first sub-frame in a block of reserved ProSe sub-frames. The sub-frame may be considered when an SR is triggered to be unavailable for ProSe discovery or communication, and the SR may be transmitted. The device may be triggered to send an uplink RACH on a sub-frame that is reserved for ProSe discovery or communication, when there is uplink data available that needs to be sent to the eNB. The device may consider the TTI configured as a ProSe resource to be unavailable for sending a RACH, or consider the sub-frame when a RACH is triggered to be unavailable for ProSe discovery or communication, and transmit the RACH.

The network may postpone the retransmission in the eNB scheduler, (DL HARQ is an asynchronous process).

Discovery resources may be allocated to an FDD DL band (subframe n+4) and the device may be allocated UL traffic in subframe n. There may be a conflict between the discovery resource and PHICH reception.

The network may allocate the discovery signal at the end of the discovery subframe in order to first decode the PHICH, and the network may switch to the discovery signal reception or transmission, (timing issues need to be carefully evaluated and a Rx/Tx switching gap). The network may restrict PUSCH allocation at subframe n−4 if a discovery zone may be allocated to subframe n.

If the network is in a time division duplex (TDD) mode, the same limitations may apply, but the time relation between the transmission and its acknowledgment may be equal to k subframes, where k≥4 and depends on the TDD DL-UL configuration. Also, because of the possible asymmetry between DL and UL subframes, a UL subframe may contain the acknowledgment of more than one DL transmission. In that case, if this subframe may be allocated to discovery monitoring, the scheduling restriction may be propagated to several DL subframes.

Possible additions to existing LTE procedures are described herein. For the infrastructure mode, idle mode devices may monitor the DISCH. Cell re-selection to a different cell may invalidate at least part of the configuration related to discovery, (e.g., any configuration received using dedicated signaling and/or received by system information broadcast), if the re-selected cell belongs to a different discovery area, (e.g., as detected from the discovery area identity during acquisition of system information).

For the infrastructure mode, PDCCH reception for assignment for D2D resources may not affect a DRX timer, (i.e., scheduling for D2D discovery may be separate from the perspective of PDCCH blind decoding. PDCCH decoding may additionally decode subframes for discovery-specific scheduling (e.g., DI-RNTI).

Time alignment timer (TAT) expiry may additionally invalidate certain types of discovery signal formats, (e.g., those that require some form of synchronization to the uplink timing of the cell. TAT expiry may additionally preclude any transmissions of discovery signals for RF discovery, and may additionally invalidate at least part of the RF discovery configuration, (e.g., the dedicated part (if any), a persistent resource).

For radio link monitoring (RLM), a device may not perform any transmissions of discovery signals for RF discovery while timer T310 is running. For DL radio link failure (RLF) and connection re-establishment, a device may not perform any transmissions of discovery signals for RF discovery while timer T311 (and/or timer T301) may be running. For UL RLF, a device may not perform any transmission of discovery signals for RF discovery when it has reached the maximum number of preamble transmissions.

For mobility, a device may not perform any transmissions of discovery signals for RF discovery while timer T304 is running (ongoing handover (HO)). For power settings, a device may not perform any transmission of discovery signals for RF discovery if, in a given subframe, the device has uplink transmissions either for PUSCH, PUCCH and/or PRACH, and the device has no power left for transmission of the RF discovery signal before reaching its maximum output power.

Measurement gaps may be up to device implementation, as long as requirements are met, or also as long as not dedicated signaling. A device may not perform RF discovery on deactivated secondary cells (SCells). SCell deactivation may deactivate and/or terminate an ongoing RF discovery on the concerned SCell.

Structures for a transport channel on which discovery information may be transmitted and/or received by a device are described herein.

Alternatives envisioned for the configuration of a DISCH may include, but are not limited to, broadcasted DISCH control information, (e.g., over a broadcast control channel (BCCH), for idle mode devices, and/or for connected mode devices). A device may receive the configuration for one or more DISCHs in the broadcasted system information. A device may also receive a PDISCH configuration. For dedicated signaling with DISCH control information, (e.g. over a signaling radio bearer 1 (SRB1), for connected mode devices), a device may receive the configuration for one or more DISCHs by dedicated RRC signaling. A WTRU may also receive a PDISCH configuration Alternatives envisioned for the acquisition of a DISCH may include but are not limited to a DISCH over PDISCH, and a DISCH over PDSCH. The DISCH may use the information transfer services of the PDISCH, in particular when the PDISCH may be transmitted directly between devices. For example, the DISCH may be scheduled similar to a PUSCH using parts of the uplink resources of a cell. The DISCH may use the information transfer services of a legacy LTE physical channel between the network and one or more devices. In this case, the concerned channel may be either a shared channel, a broadcast/multicast channel, or a dedicated channel. For example, a device may receive the DISCH on the PDSCH of a cell, scheduled by a RNTI shared by a plurality of devices in the cell.

The DISCH may be a channel that contains discovery information, (e.g., transmissions on such channels may include a discovery signal and/or may contain a payload). Such payloads may consist of one or more messages. Such messages may include one or more discovery identities. A device may monitor and receive transmissions on a DISCH, as well as transmit on a DISCH.

A device may perform security procedures, (e.g., encryption/decryption and/or integrity protection), on a DISCH transmission. In infrastructure mode, the device may receive the necessary security context from the network. In infrastructure-less mode, the device may be pre-configured with the necessary security context. For a DISCH configuration received on a broadcast channel, no security (or alternatively a null encryption algorithm) may be applied.

A device interested in discovery services may acquire the broadcasted system information and DISCH parameters. The device may further acquire the DISCH according to procedures described herein. Alternatively, or in addition, the device may report capabilities for such services when connecting to the network and/or may be configured using dedicated signaling with DISCH parameters. The device may then acquire a DISCH according to procedures described herein.

A device may be configured with one or more DISCH channels by higher layers, (e.g., the RRC layer). A device may receive such a configuration on the broadcasted system information. For example, a device may receive DISCH control information on the BCCH of a cell. In particular, a device in idle may rely on control information received on the BCCH for acquisition of a DISCH. This information may be subject to a modification period, (e.g., the device may assume that the information received for a given modification period is valid through the entire period, and that the information may only be updated at a modification period boundary). The device may receive signaling that indicates whether or not DISCH control information may be modified at the end of the current modification period, such that a device may reacquire the DISCH control information. This information may concern the acquisition of a DISCH applicable to the cell and/or to the area of the concerned cell. This information may be carried by means of a system information block (SIB) that may include one or a plurality of DISCH-config messages. This information may include a discovery area identity (e.g., a DISCH-areaID contained in a DISCHAreaConfiguration, one for each DISCH). This information may also include scheduling information for at least one DISCH, (e.g., via a DISCHSchedulingInformation information element (IE). Such scheduling information may correspond to the DL DISCH, (i.e., for DISCH transmission performed by the network). Alternatively, such scheduling information may additionally include scheduling for the PDISCH, (i.e., for scheduling of resources for DISCH transmissions by a device).

Such scheduling information may indicate semi-static scheduling information. For example, he information may include parameters such as time domain scheduling and/or physical parameters such as at least one of a subframe allocation (i.e., which subframe(s) within a radio frame), a period and an offset for the radio frame (e.g., corresponding to system frame number (SFN) mod period=offset), a signaling MCS (applied to the DISCH transmission for the concerned subframes), an indication of the non-DISCH region in the subframe, (e.g., the number of symbols before the start of the DISCH), and/or a set of physical resource blocks (PRBs) may be used for the DISCH transmission.

Alternatively or additionally, the scheduling information may indicate parameters for dynamic scheduling of DISCH transmissions. For example, the information may include an RNTI applicable to scheduling of a DISCH (DI-RNTI). A different RNTI may be assigned to each DISCH available in a cell. A device may use the signaled RNTI to decode scheduling information on a PDCCH for DCIs in the common search space of the cell. DISCH transmissions may be scheduled in frequency domain and in the time domain.

For example, a DISCH message may consist of a sequence of DISCH-messageType, (e.g., a DISCHAreaConfiguration, a DISCHSchedulingInformation, and the like). Each message may be applicable to either a downlink DISCH, (e.g., on a PDSCH), or to an uplink PDISCH, (e.g., for device transmissions).

For a device in connected mode, alternatively or additionally, the device may receive such configuration using dedicated signaling, (e.g., as part of an RRC connection reconfiguration procedure, or as part of a response from the network to a discovery request). A device may receive such a configuration by dedicated RRC signaling. For example, a device in connected mode may receive DISCH control information on SRB1. The device may receive information, similar to the information described herein for the case where control information may be received on the system broadcast, including scheduling information. In this case, the device may invalidate the configuration upon a reconfiguration that disables the discovery functionality, upon reception of a handover command, or upon moving to idle mode, (at least for the configuration received by dedicated signaling). For the handover command, the device may invalidate the configuration if the target cell is not in the same area as the source cell, (e.g., as determined by the parameter DISCH-areaID applicable to the concerned cells, for a specific PLMN).

The received configuration may be valid for the cell on which the device is camping, (or for the cell in which the device is connected). In this case, the device may invalidate the configuration upon cell reselection that changes the cell on which it is camping on. Alternatively or additionally, the configuration may be valid on any cell with the same discovery area identity, (e.g., as determined by the parameter DISCH-areaID applicable to the concerned cell(s), for a specific PLMN).

Methods for DISCH scheduling are disclosed herein. A DISCH may be transmitted on a physical channel between two devices, (e.g., on a PDISCH). A transmission on a DISCH may itself be a discovery signal, (if transmitted by a device). Typically, in infrastructure mode, the network may allocate and possibly also dynamically schedule resources for a DISCH. Alternatively, and in particular in a infrastructure-less mode, a device may schedule DISCH transmissions for timing aspects. A DISCH may be transmitted, (e.g., on the PDSCH of a cell).

For a given area, (e.g., the coverage area of a cell), at least one DISCH may be transmitted by the network using one or a plurality of PDSCHs. For example, different DISCHs may be used as a function of the type of service supported. For a given cell, one DISCH may provide discovery services for commercial advertisement, another for social networking, another for public safety services, and the like.

In an infrastructure mode, a device may transmit DISCH messages in the uplink on SRB1, (e.g., as RRC signaling). The DISCH may be transmitted by a network.

A DISCH may be statically or dynamically scheduled. When statically scheduled, the DISCH may be considered as a new broadcast channel which is periodically transmitted. When dynamically scheduled, a discovery-specific RNTI (DI-RNTI) may be used on a PDCCH, (dynamic or semi-persistent; an SPS-D-RNTI may be used in the semi-persistent case). The D-RNTI may be provided by a high level message.

For statically scheduling a DISCH, a device may obtain the DISCH periodicity and subframe offset by analyzing a new system information block, (SIBxx, e.g., SIB14). The device may be notified of a DISCH content change through a discovery-specific RNTI (DI-RNTI) sent on the PDCCH. The DI-RNTI may be a static parameter or it may be provided by a high level message. The DCI format 10 may be modified to include this new notification. This change notification may be provided a configurable number of times per modification period. The device may decode the DISCH in the next modification period (where the change applies) and obtain the updated discovery information.

If multiple DISCHs are used, the device may obtain a field in a similar message to the IE multicast broadcast single frequency network (MBSFN) AreaInfoList. This field may determine the bit position indicating a change to the associated DISCH. When a DI-RNTI PDCCH is received, the device may analyze the bitmap contained in a modified DCI format 10. In order to handle both multimedia broadcast multicast service (MBMS) and discovery on DCI format 10, bit 9 may be reserved, (e.g., 0 for MBMS, 1 for discovery). The device may determine whether to decode or not decode the updated DISCH based on the service identities it is currently monitoring.

The network involved in the discovery process may maintain a list of devices in idle mode or connected mode that are known to be currently in a certain geographical area (discovery area), and that have enabled a discovery service. For each device, the network may maintain a list of subscribed services and private services for each device; the state of the device (idle or connected mode), serving cell and C-RNTI of the device if in connected mode; and location of the device, known at least at cell level if in connected mode, or at TA level if in idle mode. The discovery server may be signaled changes in the state or location of the devices by the MME or a location server, (such an evolved serving mobile location center (E-SMLC)).

The network may initiate an RF-discovery procedure upon detection that the devices in a discovery pair may be in RF-proximity of each other. A discovery pair may be defined by a first device and a second device, where the first device is in an allowed list of the second device, and the second device is in a monitored list of the first device. If applicable, an additional condition may be defined based on a discovery attribute of at least one of the devices.

Two devices may be determined to be in RF-proximity of each other based on their serving cell (if known), their geographic location, or their TA. The criterion may depend on the RRC state of the devices. If the two devices constitute a discovery pair, the discovery pair is then in RF-proximity of each other.

The network may initiate an RF-discovery procedure upon expiry of a timer started when a discovery pair becomes in RF-proximity of each other. The value of the timer may depend on the RRC states of the devices. For example, a larger value may be used if one of the devices is in idle mode.

An RF-discovery procedure may include a discovery server determining that a device that is part of at least one discovery pair in RF-proximity of each other is a transmitting device or a receiving device (or both). The role of a transmitting or receiving device may not be necessarily linked to whether this device requested proximity information at higher layers. The network may optimize assignment of transmitting and receiving devices to minimize usage of discovery resources in transmission and/or battery consumption, (e.g., by preferentially assigning the role of transmitting device to devices that are part of multiple discovery pairs in in RF-proximity of each other and not currently in idle mode. The discovery server may request the eNB controlling the serving cell of a transmitting device to configure discovery resources to this device for transmission.

When the transmitting device is initially in idle mode, it may first be brought to connected mode using paging. The discovery resources may consist of a property of a discovery signal, (e.g., scrambling identity, CRC mask, Zadoff-Chu base sequence or cyclic shift index, and the like, depending on the nature of the discovery signal), and a set of subframes which may occur periodically, in which the discovery signals may be transmitted. The eNB may schedule transmission of a discovery signal, (within a configured set of subframes), using physical layer signaling such as DCI with a CRC scrambled by the C-RNTI or a discovery-specific RNTI (D-RNTI).

The discovery server may request the eNB controlling the serving cell of the receiving device to configure discovery resources to this device for reception. When the receiving device is in idle mode, it may first be brought to connected mode using paging. Alternatively, discovery resources may be provided to devices in idle mode by system information. The discovery resources may consist of at least one property of a discovery signal and a set of subframes which may occur periodically, in which the discovery signals may be received. The discovery resources may be configured as part of the measurement configuration of the receiving device. The eNB may schedule reception of a discovery signal (within a configured set of subframes) using physical layer signaling such as DCI with a CRC scrambled by the C-RNTI or a discovery-specific RNTI (D-RNTI).

The network may ensure that there is sufficient overlap between the discovery resources configured to the transmitting and receiving devices. In case the devices are not connected to the same serving cell, this may require coordination between eNBs.

An eNB may receive measurement results from the receiving device from RRC signaling (e.g., a measurement report) and provide the information to the discovery server. Alternatively, the discovery server may receive the measurement results from the receiving device from NAS signaling. The discovery server may determine that two devices are in RF-proximity, or are not (or no longer) in RF-proximity, based on the received measurements. The discovery server may provide RF-proximity results (whether positive or negative) to at least one of the devices using NAS signaling. The results may include measurements such as an estimate of distance, path loss, and the like. The NAS signaling may be initiated by an application in a device (i.e., a request). The NAS signaling may be initiated by the network (discovery server), (e.g., on a periodic basis), upon detection that devices in a discovery pair become in RF-proximity of each other, or upon detection that devices in a discovery pair are no longer in RF-proximity of each other. The discovery server may also provide proximity results, where proximity is not restricted to RF-proximity, using NAS procedures similar to those used for the provision of RF-proximity results, (or using the same NAS signaling).

A device may (upon request from an application or end-user) enable or disable use of the discovery service by using NAS signaling. The device may initiate an RRC connection request for this purpose. The device may also provide this information as part of a NAS message (e.g., a mobility management message), such as a TA update. The device may provide a monitored list and/or an allowed list to the network, along with at least one discovery attribute. The device may request immediate discovery information for at least one device.

The device may request notification of change of discovery information for at least one device. For example, a device may receive notification when another device is no longer in proximity, or becomes in proximity.

During an RF-discovery procedure, a transmitting device may transmit the discovery signal according to the configured discovery resource, transmission power and timing. The discovery signal may be transmitted if DCI with a CRC scrambled with a valid RNTI was received in the same or a previous subframe. The valid RNTI may be the cell RNTI (C-RNTI) of the device or a D-RNTI.

During the RF-discovery procedure, a receiving device may attempt detection of a discovery signal in the configured discovery resource and if DCI with a CRC scrambled with a valid RNTI was received in the same or a previous subframe. The valid RNTI may be the C-RNTI of the device or a discovery-specific RNTI. The receiving device may attempt to blind detect a value of a property of the discovery signal among a set of values of this property, where the set of values may be pre-defined or provided by higher layers. For instance, the property may be a specific Zadoff-Chu base sequence among a set of possible base sequences. The receiving device may estimate, for each detected discovery signal, its signal strength, signal quality, and timing.

The receiving device may report at least one of the following measurement results to the eNB using physical layer signaling (e.g., a binary indication of detection over PUCCH), MAC or RRC layer signaling (e.g., a measurement report). When the device receives in idle mode and is detected at least one discovery signal, the device may initiate an RRC connection for the purpose of providing the measurement results. Alternatively, the receiving device may report the measurement results to a discovery server using NAS signaling. The measurement results may include positive or negative indication of detection of at least one discovery signal, possibly for a set of possible property values, or a list of property values for which a discovery signal is detected. The measurement results may also include signal strength and/or quality information as well as timing reception information.

The procedures described above may be used to enable a distributed system for service discovery and proximity detection. Distributed service discovery with full support from a network infrastructure is described herein.

The network, (e.g., a network component such as an eNB), may broadcast on the system information of a BCCH a configuration for a DISCH. For example, an SIB may include a DISCH scheduling information IE that configures a RNTI (e.g., a DI-RNTI) for dynamic scheduling of transmission on the DISCH. Alternatively, the SIB may configure a semi-static set of PRB resources and an MCS. The SIB may additionally include parameters that allow devices to determine scheduling occasions for transmissions on the DISCH, including a period, an offset and a subframe allocation within a radio frame corresponding to SFN mod period=offset. For example, when the DISCH is broadcasted by the network on a BCCH, and there is additionally a PDISCH for RF discovery transmissions between devices, one additional physical discovery RNTI (PD-RNTI) may be configured for scheduling of PDISCH resources. The network may dynamically schedule DISCH transmissions on a BCCH, (e.g., by a DI-RNTI on a PDCCH). The network may dynamically schedule DISCH transmissions on a PDISCH, (e.g., by PD-RNTI on a PDCCH).

The network may transmit discovery information on the DISCH transmissions on a BCCH, including one or more discovery identities. For example, each identity may be associated with a configuration (e.g., an index) to a physical resource (time/frequency) for RF proximity detection. In another example, each identity may be associated with a window for RF proximity detection. In yet another example, such discovery entities may be derived from discovery information received from a device in a discovery request. The network may receive requests from one or more devices for resources to perform RF discovery for a given discovery identity. The network may assign and/or schedule resources for RF discovery to one or more devices for a given discovery identity. The network may assign an RF discovery identity to a given service discovery identity. The network may schedule a device, (e.g., by PD-RNTI on a PDCCH or on the DISCH), to transmit a discovery signal in a given resource, (e.g., on a PDISCH). The network may schedule a device, (e.g., by PD-RNTI on a PDCCH or on the DISCH), to listen for a discovery signal in a given resource, (e.g., on a PDISCH).

A discoverable device may acquire a DISCH configuration using the signals transmitted by the network. A device may determine that it may be discoverable. For example, an application may generate and/or determine a suitable service discovery identity, and request through an API that the specific service discovery identity be made available to other devices.

The device may initiate a service discovery request procedure, whereby the device transmits at least one discovery identity to the network, (e.g., to the network). The device may transmit a NAS message in an RRC protocol data unit (PDU) over a signaling radio bearer (SRB).

The device may receive a response, (e.g., accept, reject, reject with backoff), from the network. For example, the accept response may include one or more parameters, (e.g., timing, window, RF discovery identity and/or physical resource), necessary to transmit an RF discovery signal associated with the service discovery identity.

The device may receive an RF discovery identifier associated with the service discovery identity in the accept response. Otherwise, the device may monitor the DISCH to detect such information.

The device may receive the scheduling information for the discovery signal in the accept response. Otherwise, the device may monitor for PD-RNTI on a PDCCH or the DISCH to detect such information for the concerned discovery identity.

The device may transmit an RF discovery signal in the resource associated to the request for the service discovery identity, in the subframe(s) where such resource is available.

The device may receive a report from the network regarding one or more devices that are in RF proximity for the associated RF discovery identity. This may complete a procedure for mutual discovery.

Alternatively, the device may not receive any report and the procedure for unidirectional discovery may be terminated. In this case, other devices that may have detected RF proximity may report the discovery to their respective application. Given the service identity, applications may determine what is in RF proximity and whether or not the application may, in turn, make a service identity discoverable. If so, then the procedure may be repeated in the converse direction for mutual discovery.

A monitoring device may acquire DISCH configuration using the signals transmitted by the network.

The device may determine that it may monitor for a discovery identity. For example, an application may determine a suitable service discovery identity, and request through an API that the specific service discovery identity be monitored for a certain window of time.

The application in a first device may initiate the monitoring procedure from user input and/or from a data exchange at the application level with a peer application, (e.g., in a second device). For example, the application in the second device may indicate to the application in the first device that it may be discoverable for a certain period of time. Upon reception of this indication, the user may be notified and may agree to perform the monitoring procedure. Alternatively, the application may automatically perform the monitoring request through the API. The indication exchanged at the application level may include a service discovery identity.

The monitoring device may monitor the DISCH for the concerned service identity. If the device detects the concerned service discovery identity, the device may also receive scheduling information for an associated RF discovery signal on the DISCH. If the device does not receive scheduling information for an associated RF discovery signal on the DISCH, the device may report interest to the network for the service discovery identity such that it may later receive the scheduling information. The device may monitor for PD-RNTI on a PDCCH to detect scheduling information for the concerned discovery identity.

The device may monitor for an RF discovery signal in the resource(s) associated with the service discovery identity, in the subframe(s) where such resource is scheduled. The device may detect RF proximity for the service discovery identity.

For example, the device may report RF proximity for the associated service discovery identity through the API. The application may then determine what is in RF proximity and whether or not the application may, in turn, make a service identity discoverable.

The device may initiate a service discovery procedure, (e.g., in the converse "direction" for mutual discovery). The device may report RF proximity for the associated service discovery identity to the network.

For example, a first user, "Bob", and a second user "John" may have a known relationship (e.g., they are friends) for an application X (e.g., Facebook). Application X may manage identities, (e.g., a URI or equivalent numerical token), for each relationship (e.g. John@Facebook=>Bob and Bob@Facebook=>John, or Facebook::John⇔Bob) for given users. A third user "Maria" may not have a known relationship with Bob, but may have a connection to John. Application X may implement an API to a wireless module associated to the device of each concerned user. An instance of Application X application may run on the device of each concerned user, and a proximity detection function may be enabled for each instance.

In this example, Bob may desire to determine whether or not his friend John is in proximity. Thus, Bob may activate the proximity detection function in his Facebook application. Bob may also activate the function by which he desires to make himself, (e.g., his application and his device), visible for discovery by his friend John. The Facebook application may identify the corresponding connection. The identity of the corresponding connection may already be known, (e.g., determined when both users connected using the application), or the application may obtain the connection identity from the application server over an established Internet connection. The connection identity may be passed through the API. The connection identity may be converted into a discovery ID in the process.

Both Maria's and John's Facebook applications may have their respective proximity detection functions enabled such that friends in proximity may be detected. The wireless module may be configured by the application with the necessary identities through an API. Maria, Bob and John's devices may each acquire a system information broadcast in the cell according to legacy methods, and additionally may acquire thereof a DISCH configuration.

Bob may make his device discoverable for John's device in application X, which application may determine the service discovery identity, (e.g., AppX::John⇔Bob), convert it to the proper format and pass the request to the device's wireless module. Bob's device may send a discovery request to the network, including the service discovery identity. Bob's device may receive a discovery response that acknowledges the request.

Application X in John's device may have the discovery function activated, and may be aware of the service discovery identity for the connection with Bob's device, (e.g., AppX::John⇔Bob). Application X may have configured the wireless module of John's device with all identities of interest, including "AppX::John⇔Bob".

Application X in Maria's device may have the discovery function activated, and may not have a connection with Bob's device but may have one with John's device, (e.g., AppX::Maria⇔John). Application X may have configured the wireless module of John's device with all identities of interest.

Maria, Bob and John's devices may acquire a DISCH for the cell, (e.g., by dynamic scheduling by DI-RNTI on a PDCCH. All three devices may detect one or more service discovery identities broadcasted on the DISCH, including an identity corresponding to AppX::John⇔Bob and an associated configuration (in time and frequency) for an RF discovery signal, including an RF discovery identity and a validity period.

Maria's device may not recognize the identity corresponding to AppX::John⇔Bob. Maria's device may not perform any further action than continue to monitor the DISCH.

John's device may recognize the identity corresponding to AppX::John⇔Bob, and initiate the monitoring of the corresponding RF discovery signal.

Bob's device may transmit the corresponding RF discovery signal in the time/resource allocated for the service discovery identity. Bob's device may repeat the transmission until the expiration of the validity period.

John's device may successfully receive the corresponding RF discovery signal in the time/resource allocated for the service discovery identity. The wireless module in John's device may indicate to Application X via the API the presence of the service identity and the detection of proximity. Either the application may determine that the discovery procedure is complete (unidirectional discovery), or the application may initiate a service discovery using an identity corresponding to AppX::Bob⇔John to complete the mutual discovery using a similar procedure, but as the discoverable device.

Bob's device may terminate transmission of the RF proximity signal for the concerned service identity. The wireless module in John's device may indicate to Application X via the API the completion of the discovery procedure for the concerned service identity. Either the application may determine that the discovery procedure is completed (unidirectional discovery), or the application may initiate a service discovery using an identity corresponding to AppX::Bob⇔John to complete the mutual discovery using a similar procedure, but as the monitoring device.

Service discovery, with partial support from a network infrastructure, is described herein. This may differ from previous descriptions in that devices may broadcast the discovery identity (ID) themselves on resources allocated and scheduled by the network, (i.e., the network may never detect the discovery ID when the charging is done per application and the network may detect the discovery ID, and charging may be performed per device and the network may not need any information on the discovery ID). The resources may also be used to detect proximity.

Service discovery, without network infrastructure, is described herein. This may differ from previous descriptions in that devices may be configured to determine resources to use for the DISCH, and perform all operations on the DISCH. Transmissions on the DISCH may also be used to detect proximity and take on a master-slave role.

The network may "police" requests by access rights, application type, and the like. A monitoring device may determine subsets of service ID ranges of interest.

A discovery channel may be a set of resources reserved for D2D discovery. This may include a discovery signal, an acknowledgment signal and, eventually, a synchronization signal. A discovery signal channel may be a set of resources reserved for one or more discovery transmission signals.

Methods and apparatus for the transmission of at least one discovery signal in one or more subframes are described herein. These methods and apparatus may be utilized as part of a higher-level discovery procedure including, but not limited to, any procedure described herein.

Triggers to initiate the transmission procedure are described herein. A transmission procedure may be initiated when a device receives an explicit indication from the network to initiate the transmission procedure. The indication may consist of a probing request or of a probing and scanning request. The indication may be provided by physical layer, MAC or RRC signaling.

A transmission procedure may be initiated in response to a periodic procedure. A period of time may have elapsed since initiation or completion of another transmission procedure, (e.g., the last transmission procedure, or the last transmission procedure triggered by the same event). This period of time may be pre-defined or provided by the network through higher layer signaling.

A transmission procedure may be initiated when a device detects a discovery signal of a certain type above a certain quality threshold in a previous subframe. The type of discovery signal detected may be a specific type to request initiation of the transmission procedure, (e.g., transmitted by another device that desires to discover nearby devices).

A transmission procedure may be initiated after a handover or re-establishment for a device, (e.g., in accordance with an indication by an IE), or after detecting that the device may have entered an area where discovery procedures are enabled.

The following additional conditions may be useful for the device to meet to initiate the transmission procedure for certain events. The device may be in an area or cell where discovery procedures are enabled. The device may be synchronized to the network, (e.g., a timing advance timer may be running). The device may not be experiencing a radio link problem, (e.g., an in-sync condition may be detected). The characteristics of the discovery signal as well as the transmission power, subframe(s), and resources used for its transmission may be dependent on the event that has triggered the transmission procedure.

Triggers to interrupt the transmission procedure are described herein. A transmission procedure may be terminated when the device receives an explicit indication from the network to interrupt the transmission procedure. For example, the device may have received a probing or scanning request which preempts the probing procedure or request that triggered the transmission procedure, or changes its probing or scanning state. The indication may be provided by physical layer, MAC or RRC signaling.

A transmission procedure may be initiated when the device transmits a maximum number of discovery signals since initiation of the procedure. A transmission procedure may be initiated when the device detects a discovery signal of a certain type above a certain quality threshold in a previous subframe. The type of discovery signal detected may be a specific type to request interruption of the transmission procedure, (e.g., transmitted by another device). A transmission procedure may be initiated when the device identifies all of the elements from a list of potential neighbors provided in a probing/scanning request.

Figure 4:
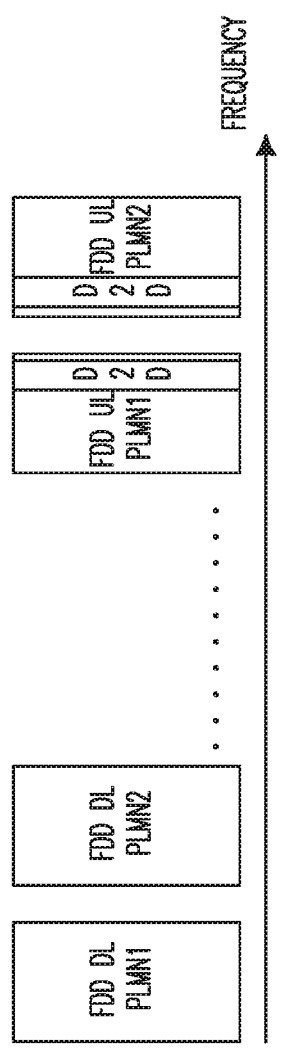
FIG. 4 shows an example of public land mobile network (PLMN) dedicated discovery channels allocated in-band.
Figure 5:
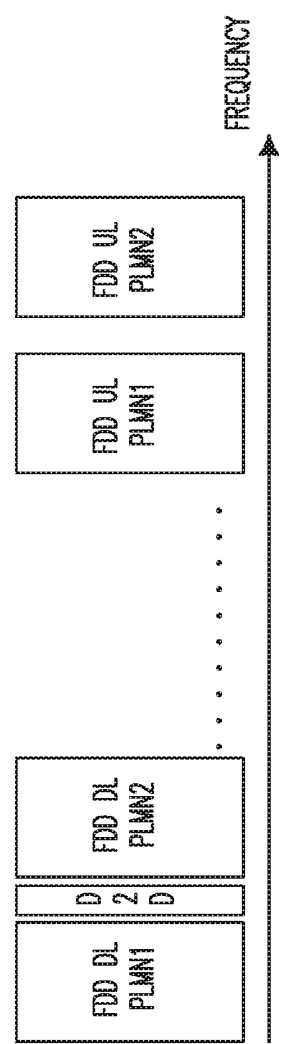
FIG. 5 shows an example of a common discovery channel allocated out-of-band.

Methods and apparatus for the discovery signal resources and indexes are also disclosed herein. FIG. 4 shows an example of PLMN dedicated discovery channels allocated in-band. FIG. 5 shows an example of a common discovery channel allocated out-of-band. Thus, the discovery channel may be placed in-band (i.e., sharing the same spectrum as the network) or out-of-band (i.e., out of the network spectrum).

The out-of-band case may cause additional RF complexity including but not limited to a power amplifier, a filter, or a duplexer. In this case, the discovery channel may be dedicated to one PLMN, or shared between different PLMNs, which may ease discovery between devices belonging to different PLMNs.

The cellular network and the D2D duplexing method can be FDD, half FDD (HFDD) or TDD. However, the D2D TDD mode may be preferred as it doesn't require adding two baseband and RF chains on each device because one additional Tx or Rx chain is required.

In the out-of-band case, the D2D duplexing method may be TDD, and the discovery channel may be allocated closer to a TDD band, an FDD DL band, or an FDD UL band. Different interference scenarios may apply to each case.

If the D2D duplexing method is TDD, the discovery channel may be allocated either to a network DL or a UL resource, with this network being in an FDD or TDD mode. Allocation on a DL resource may have the advantage that multiple scanning devices do not need to reconfigure Rx for reception of the discovery signal. Allocation on a UL resource may reduce D2D interferences that may impact eNB reception rather than devices. As the network controls D2D discovery and communications, it may mitigate those interferences more easily.

Independent of the duplexing mode, the discovery channel may correspond to a set of subframes, slots, orthogonal frequency division multiplexing (OFDM) symbols, subcarriers, resource blocks, or carriers. This channel may be split between a discovery signal, an acknowledgment signal and eventually a synchronization signal or be shared between them. Those resources may be allocated on the same time slots than network communications, (e.g., interferences may be carefully handled), or on time slots dedicated to a discovery channel.

FIG. 6 shows an example of a discovery channel allocated in-band time division multiplex (TDM) with UL. The discovery signals may be configured as a set pattern or offset of resources to be used from scheduled downlink or uplink resources. The discovery signal may operate in TDM with the uplink or downlink transmission, with the TDM pattern provided as a configuration parameter to the device. The cross-link (XL) discovery resources may be in-band and TDM with the uplink resources. Further resources used in the XL sub-frame may be limited to a subset of uplink resources. Furthermore, the designated XL sub-frame may be further configured to operate in a device-specific TDD pattern, (e.g., use slot 0 for transmitting discovery signals and use slot 1 for listening to discovery signals).

In order to ensure proper reception of low-power beacons, it may be desirable to configure the neighboring devices to perform DTX in sub-frames where the beacon transmission or reception may occur. The network may configure a DTX pattern for neighboring devices with operational rules on how to operate in the presence of the DTX pattern configuration. In one example, a device may prohibit performing a random access channel (RACH) scheduling request (SR) on a subframe configured for DTX or use it for SPS purposes. In another example, the device may be configured with a prioritization rule to allow certain uplink transmission to be performed at a higher priority over crosslink discovery transmissions. For example, if in the DTX allocated sub-frame, an uplink positive acknowledgement (ACK)/negative acknowledgement (NACK) and CQI may be required to be sent, the A/N and CQI may be considered a higher priority over the crosslink DTX.

The discovery channel may be contention-based or contention-free (TDD or FDD), or a combination of both, (e.g., such as the PRACH allocation in LTE). Some resources may be reserved for specific users (e.g., when their discovery procedure has a higher priority or lower latency requirements), while other resources may be organized within sets allocated to a group of users.

In the case where a contention-based access to resources may be used, and the discovery signal acknowledgment may not be received through the network or directly from the device, a random back-off procedure may be applied to resolve the contention. This back-off may be applied to any D2D discovery resource.

The set of D2D discovery resources used in the transmission procedure may be determined based on an explicit indication of the resources from the network, (e.g., through physical layer (PHY), MAC, or RRC signaling). For example, the device may be indicated by a set of resources using a resource configuration index with a pre-determined mapping.

The set of D2D discovery resources used in the transmission procedure may be determined as a function of a configuration parameter, such as a device-specific parameter (e.g., C-RNTI) or a cell-specific parameter (e.g., PCI). For example, in the case that the discovery signal is a PRACH, the preamble index may be a function of the C-RNTI.

The set of D2D discovery resources used in the transmission procedure may be determined as a function of a discovery mode in which the device may be operating in, (e.g., use slot 0 to transmit and slot 1 to receive).

In another method, the device may randomly determine a set of resources from a larger set of candidates in an autonomous manner, (e.g., going in a sequence of using the resource blocks (RBs) in some order, (e.g., sequentially, and the like).

The method used may be dependent on the event triggering the transmission procedure. One method may be more suitable to a periodic transmission procedure, while another method may be more useful when the procedure has been triggered by the reception of a discovery signal.

Methods and apparatus for the discovery signal design are described herein.

The discovery signal may consist of a signal or physical channel currently used in LTE systems. It may also consist of a signal not currently defined. Some functionality may be required to support the use of the signal and some functionality may be enabled by the use of the signal.

The transmission and/or reception of certain types of discovery signals may require a prior coarse or fine timing acquisition. Examples of discovery signals requiring prior fine timing acquisition may include but are not limited to a physical control format indicator channel (PCFICH), PDCCH, PDSCH, physical HARQ indicator channel (PHICH), and physical uplink shared channel (PUSCH). Examples of discovery signals requiring prior coarse timing acquisition may include but are not limited to PRACH, SRS, and UL demodulation reference signal (DM-RS). Other types of discovery signals, such as primary synchronization signal (PSS), secondary synchronization signal (SSS) may not use any prior synchronization.

Certain types of discovery signal may include reference patterns that may be used by the receiver to estimate a coarse or fine timing. Examples of such discovery signals may include but are not limited to PSS/SSS, physical broadcast channel (PBCH), and PRACH.

Certain types of discovery signals may include a guard band and/or guard time, thus providing protection against time or frequency offsets and allowing transmission of the signals adjacent (in frequency or time) to regular LTE network signals. Examples of such discovery signals may include but are not limited to PSS/SSS and PRACH.

Certain types of discovery signals may allow the transmission of an information payload. Examples of such signals include but are not limited to PDSCH, PUCCH, and PUSCH. Other discovery signals may only be characterized by a finite set of parameters such as an index and/or a code.

Certain types of discovery signals may have flexibility in terms of bandwidth (number of subcarriers or resource blocks) and time (number of slots or subframes). Certain types of discovery signals may be transmitted in parallel in a resource or a set of resources. Certain types of discovery signals may be detected with higher or lower missed detection probability or error probability for a given receive signal-to-noise ratio. Certain types of discovery signals may be used in the downlink direction in current systems while others may be used in the uplink direction. Certain types of discovery signals may have commonality and/or compatibility with LTE previous releases (e.g., R8-11), allowing current device Tx and Rx chains to be reused without modification or with little cost FIGS. 7A and 7B show LTE signal properties for discovery signal design. One or a combination of these signals may be used as a baseline for the discovery signal design. The signals based on Zadoff-Chu sequences may be particularly of interest, as they may allow orthogonal transmission between different users on the same set of resources. Coarse synchronization may be required if different cyclic time shifts are used on the same Zadoff-Chu base sequence. For example, for a three to five RB allocation, 30 base sequences with low cross-correlation may be available. Cyclic time shifts of any of those base sequences may allow generation of purely orthogonal sequences, (zero cross-correlation provided that the cyclic shifts are longer than the channel impulse response). Twelve equally-spaced cyclic time shifts may be defined for the DMRS on the PUSCH and PUCCH. This may allow for delay spreads of up to 5.55 µs. In the D2D discovery context, this may allow running twelve parallel probing procedures in the same cell on the same set of resources. With this approach, a device may also be able to decode different probing signals in parallel, and thus to discover different neighbors simultaneously.

A reuse of the PSS/SSS combined to a PBCH channel may allow including a payload (and thus additional content) to the discovery signal. Alternatively, a reuse of the PRACH signal may be implemented as it has already been specifically designed for random access and may only require slight modifications for D2D discovery.

Moreover, additional diversity schemes may be included in the discovery signal design. Those schemes may be one or any combination of time, frequency or space diversity. Repetition coding may be used, (e.g., the discovery signal may be repeated in several time/frequency/space resources). Allocation interleaving may be implemented, (e.g., a discovery signal of different users may be split and interleaved in several time/frequency/space resources). The discovery signal may be spread over additional resources with the discovery signal multiplied by a pseudo-noise sequence.

Figure 8:
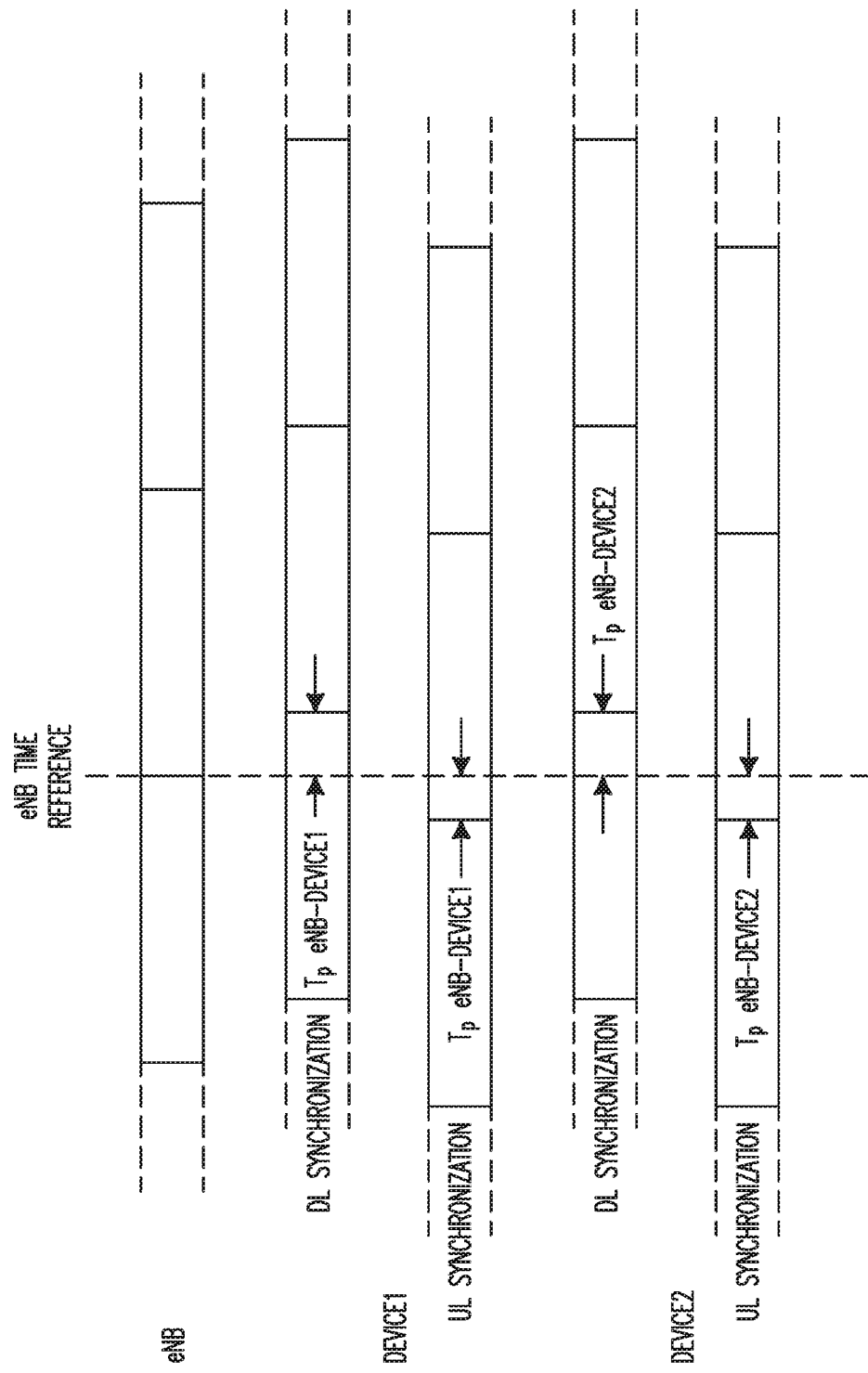
FIG. 8 shows an example of device-to-device (D2D) downlink (DL) or uplink (UL) synchronization.

Methods and apparatus are also disclosed herein for the transmission power and timing of the discovery signal. FIG. 8 shows an example of device-to-device (D2D) downlink (DL) or uplink (UL) synchronization. A device may use the DL or UL network synchronization as a reference for D2D transmission. In a probing state, a device may transmit a specific synchronization burst which may be part of the discovery signal or independently transmitted on a different channel resource. The device may synchronize on an external synchronization source such as, for example, a global positioning system (GPS) signal.

A time stamp may be included in the discovery signal. Any other pertinent timing information may also be joined including but not limited to the network UL timing advance status.

The discovery signal transmitter may be required to adjust its timing. The network may require an adjustment, (e.g., based on its knowledge of the different devices' timing, as acquired during the timing advance procedure). This adjustment may be required to decrease the timing offset between the discovery signal transmitter and one or several potential neighbors.

A potential neighbor may require a timing adjustment to the transmitter through the acknowledgment channel after the first discovery signal transmission. The potential neighbor may be already involved in the discovery procedure with another device and the timing difference between the two discovery signal transmitters may be too large to properly decode both signals. The potential neighbor may require this adjustment to properly setup the following D2D communication phase, (e.g., to be more robust against multipath changes, and the like).

This adjustment may be required to achieve a common D2D group synchronization. In the case where several potential neighbors may be involved in a discovery procedure, and these devices may not all be within the same range, a synchronization objective may be to adjust the timing to the most delayed device in the group in order to achieve a common synchronization within the group. Each device may track the timing difference between itself and its neighbors, and communicate this information through the acknowledgment signal or by other means in the communication phase. After each device discovery, the transmitter can update its timing to the most delayed device.

FIG. 9 shows an example of a distributed D2D synchronization strategy with a time window defined by a network. The distributed synchronization adjustment (per device or per group of devices) may occur within a timing window defined by the network in order to limit the D2D interferences with the network. Another purpose of the timing window may be to preserve the capability for a device to achieve parallel detection or transmission of D2D communications and network communications.

Methods and apparatus for power control are also described herein. The discovery signal Tx power may be static within a given cell and may be predetermined based on parameters including but not limited to the cell size or the propagation environment, (such as urban or rural). The Tx power may be assigned to a minimum value for the first transmission. If this transmission is not acknowledged, then a ramp up may be applied to the power for each new transmission. The maximum power that may be reached may be either a static network parameter, or it may be determined by the network and distributed, (e.g. through the probing request procedure based on the current network status including but not limited to the level of interference or traffic load).

A closed loop mechanism may be used between the discovery signal transmitter and the potential neighbors. Different measurements may be applied at the receiver to determine the offset to be applied to the discovery signal Tx power. This offset may be sent through the acknowledgment message or indirectly through the scanning report. After decoding the scanning report, the network may transmit a Tx power adjustment to the probing device through a specific message or through a new probing request. The network may validate the power increase request based on the current network status, including but not limited to the level of interferences or traffic load. The network may eventually request sounding procedures from other devices to make sure that the network resources may still be properly shared between the D2D discovery and usual network communications.

The static or maximum Tx power may be segmented in D2D range classes. These classes may limit the maximum D2D range accessible to one device. This limitation may be defined based on network parameters including but not limited to the maximum D2D interference level in a urban environment, or charging methods, such as device's access to a higher class costing the subscriber more. Finally, a D2D network parameter may be defined as the maximum number of D2D users having access to class A range (e.g., 50 m), the maximum number of D2D users having access to class B range (e.g., 100 m), and the like.

The discovery signal may contain parameters including but not limited to transmitter identity, transmitter group identity, transmitter network parameters (e.g., cell, PLMN, attachment status, RRC status, and the like), and/or a power and timing reference from the transmitter. The timing may be explicitly provided by a time stamp, or implicitly provided through a synchronization burst.

The discovery signal may contain parameters including but not limited to a discovery signal retransmission number, a discovery signal maximum retransmission number, a service description from the transmitter, (e.g., if the transmitter is a device dedicated to store advertisement, it may contain the store name as well as some of the store promotions), a list of pre-selected devices (potential neighbors) for D2D discovery (identified by any device-specific identifier such as C-RNTI), a list of targeted device capabilities, (e.g., attachment to a network, specific PLMN, specific cell, specific group, or relay capabilities), an acknowledgment request, (which may include the message destination: device or eNB), a discovery procedure identifier, a discovery procedure priority, and/or a discovery procedure start time and end time (if any).

At least one of the above-mentioned parameters may be explicitly provided in the discovery signal payload. Further, at least one of the above-mentioned parameters may be implicitly included in the discovery signal properties. This may be implemented through a specific discovery signal, a specific discovery signal resource or a specific discovery signal index. The mapping that allows retrieving the signal information from its properties may be implemented through a mapping table. This table or the specific parameter(s) may be distributed to the device by the network before or after the discovery signal transmission, (e.g., by the D2D discovery request or by the D2D neighborhood notification).

The discovery signal may have no other properties other than its resource and index mapping, and any other information that may be provided by the eNB after the scanning report, (through the mapping of this resource and index).

Security may be a major concern of any new feature in wireless communications. It may be particularly sensitive for D2D applications, as this kind of service, if not properly secured, may easily reveal user identity, user localization, and/or membership to a specific group that the user would like to keep confidential. Also, as in D2D communications, because part of the control is decentralized to the device, a security breach may be opened in the entire network through this kind of application.

A trust center may be mapped to any network element with security trust capabilities including but not limited to an eNB, an MME, a home subscriber server (HSS), or to a special device node with the same capabilities. Mapping to a special device node with the same capabilities may be particularly adapted to off-network D2D discovery cases.

To implement security, the D2D discovery context may be to authorize the D2D discovery request. Depending on the application, the trust center in charge of that authorization may be located at different levels in the network, (e.g., the MME, eNB, or device). This authorization may be related to the D2D device profile stored in another entity (e.g., an HSS) or in the trust center itself. This authorization may be followed by the discovery priority handling. If the network is already saturated by other discovery procedures, the new discovery may be delayed or rejected by the network.

Another key security item in D2D discovery may be the anonymity of one or several entities involved in the discovery procedure. Depending on the D2D discovery request type, anonymity of a seeking device, D2D discovery group, and/or potential neighbors may be required. Different methods and apparatus may be applied to preserve this anonymity.

FIG. 10 shows an example of seeking device anonymity preservation. As shown in FIG. 10, the network may define a secret mapping between the discovery signal resource allocation and the D2D discovery request. The network may send probing and scanning requests to one or more devices using the usual eNB-device secured link. These requests may be encrypted such as any other network data, and they may be limited to include the discovery signal resources to identify. Even if the discovery signal may be identified by a device not involved in the D2D discovery request, this device may not able to identify any specific information about the D2D discovery request. This secret mapping may be renewed periodically so that no cross-correlation between certain applications and certain discovery signal signals may occur.

After receiving the scanning report, (i.e., after discovery signal identification for this D2D discovery request), the network may check that it corresponds to an authorized D2D discovery request and provides the authorized details including but not limited to the seeking device, the D2D discovery group, and the seeking application to the authorized nodes through the neighbor notification message.

The seeking device, group and or potential neighbor identities may be communicated via an encrypted signal. This encryption may be based on pre-shared keys, certificates or credentials. Those security parameters may be distributed offline or over the air, depending on the level of confidentiality required. In the case where they are communicated over the air, they may be protected by the usual network security procedures, (e.g., they may be communicated as a parameter of the D2D discovery request), and they may be assigned per device pair or per D2D discovery group. A device requiring anonymity may remain in a scanning mode.

Apart from the anonymity problem, authentication of the discovery signal transmitter may be ensured. This may be processed through the same options, controlled by the trust center, which may provide the signature parameters to the probing device and check it after scanning report. Alternatively, it may be distributed to the devices and based on pre-shared keys, certificates, or credentials, (used for signal signature).

Because the Tx power of D2D communications is lower than that of an eNB, it may be more sensitive to flooding or jamming attacks. For example, a network intruder may continuously transmit a discovery signal in order to disturb any D2D discovery in a given area, or in order to get some information from other devices. These type of attacks may be mitigated by the trust center periodically updating the discovery channels so that the intruder may not be able to track it and to interfere with the D2D discovery. The robustness of this solution may increase with the update period decrease. Alternatively, the network may setup a procedure to report bad or abnormal behavior on a given D2D allocated resource. The scanning device may report a specific interference or a signal with a bad index, (i.e., any information that may assist the network to identify an intruder). The network may cross-correlate this information with its own knowledge of the current D2D discovery requests, probing devices, and the like in order to make a good decision about that behavior.

Another attack that may degrade a D2D service is the replay attack. In this attack, the intruder may record a signal and then replay it at a later time to take the identity of a node already authorized on the network. As a result, the intruder may be able to send a signal with correct encryption parameters. In the D2D discovery context, two counter measures may be applied to a discovery signal.

A timestamp (e.g., the subframe number) may be added to the signal payload based on the network time reference at the transmitter. This timestamp may be checked against the network time reference at the receiver. If the timestamp is not valid, the signal may be discarded, and eventually a report may be sent to the network.

The discovery signal may be randomized according to a time parameter, (e.g. the randomization seed may be equal to the subframe number), at the transmitter. De-randomization may be processed at the receiver according to the same time parameter. In the replay attack case, the seed may be different and the signal may not be understood. A token may be sent with the discovery request. This token may be used to encode a part of the discovery signal and may be renewed for any new procedure. These measures may be combined with a periodic update of other security parameters including but not limited to the encryption keys.

Triggers to initiate reception procedures are described herein. The device may be separately configured to begin listening to the discovery signals when the device receives an explicit indication from the network to initiate the reception procedure. The indication may consist of a probing request or a probing and scanning request. The indication may be provided by physical layer, MAC, or RRC signaling.

The device may be separately configured to begin listening to the discovery signals when a period of time has elapsed since initiation or completion of another transmission procedure, (e.g., the last transmission procedure, or the last transmission procedure triggered by the same event). This period of time may be pre-defined or provided by the network through higher layer signaling.

The device may be separately configured to begin listening to the discovery signals when the device detects a discovery signal of a certain type above a certain quality threshold in a previous subframe. The type of discovery signal detected may be a specific type to request initiation of the transmission procedure, (e.g., transmitted by another device that desires to discover nearby devices).

The device may be separately configured to begin listening to the discovery signals after a handover or re-establishment may have occurred, (e.g., if an IE indicates that it may be implemented), and/or after detecting that the device has entered an area where discovery procedures may be enabled.

Additional conditions may need to be met for the device to initiate the reception procedure, at least for certain events, which may include but are not limited to the device being in an area or cell where discovery procedures may be enabled, the device being synchronized to the network, (i.e., a timing advance timer is running), and/or the device not experiencing radio link problems (i.e., in-sync condition may be detected).

The characteristics of the discovery signal, as well as the transmission power, subframe(s), and resources used for its transmission, may be dependent on the event that has triggered the transmission procedure.

Triggers to interrupt reception procedures are described herein. A reception procedure may be terminated. For example, the device may receive an explicit indication from the network to interrupt the reception procedure. The device may have received a probing or scanning request which preempts the scanning procedure or request that triggered the reception procedure, or changes its probing or scanning state. The indication may be provided by physical layer, MAC, or RRC signaling. In another example, the device may receive a maximum number of discovery signals since initiation of the procedure. In yet another example, the device may detect a discovery signal of a certain type above a certain quality threshold in a previous subframe. The type of discovery signal detected may be a specific type to request interruption of the transmission procedure, (e.g., transmitted by another device). The device may identify all of the elements from the list of potential neighbors that it was looking for.

Methods and apparatus for discovery signal reception are described herein. Depending on the discovery signal design and the discovery procedure configuration, single (one discovery signal iteration reception at a time) or parallel detection (several discovery signal iterations reception at a time) may be applied. Parallel detection may impose limits on timing and power offset between the different device signals. An optimal compromise may be defined between the robustness of each detection and the maximum number of parallel processes.

Depending on the D2D discovery type, specific or blind detection may be processed. In a specific detection, the device may know which discovery signal may be present in the scanned channel. In a blind detection, the device may not know which discovery signal may be present in the scanned channel.

The reception of the discovery signal(s) may start with the synchronization stage. The synchronization reference may be based on the network (DL or UL), a specific synchronization burst, or an external source such as a GPS signal. These different methods may be combined. The receiver may open its reception window based on the network synchronization and may identify an incoming synchronization burst within the reception window through autocorrelation (repetitive pattern) and/or through a cross-correlation between a reference pattern and the incoming signal. Auto-correlation and cross-correlation processes may be implemented either in the time domain or in the frequency domain, (e.g., through the use of a sliding fast Fourier transform (FFT)).

Channel estimation and compensation may follow in the reception procedure if the discovery signal includes known reference patterns, (pilots, preamble, and the like). The discovery signal design may dictate the decoding strategy. In the case where the discovery signal reuses an LTE channel design (PRACH, PDCCH, PDSCH, and the like), the same decoding chain may be reused.

In the parallel detection case, iterative decoding techniques may also be applied where identified discovery signals may be subtracted from the incoming signal and a new decoding iteration may be processed.

If the discovery signal is a retransmission, signal combining may be applied with the previous transmissions. Different parts of the signal may be sent in each transmission and the receiver may feed the decoder and try a new decoding with the sections already received, (incremental redundancy). Alternatively or in combination, the same message may be sent several times, and the receiver may combine the in-phase and quadrature (IQ) values, or the log-likelihood ratios before sending the combination to the decoder (Chase combining). The retransmission may be terminated through a signal acknowledgment.

If the discovery signal includes a payload, signal integrity checks may be implemented through the CRC decoding. The reception procedure may also include discovery signal measurements. Metrics that may be measured are one or any combination of but not limited to: RSRP, RSRQ, CQI, path loss, or time and frequency offsets.

Methods and apparatus for discovery signal acceptance are described herein. A payload may be associated to the discovery signal. A CRC may be performed at the signal transmission and may be used to check the signal integrity at the reception. Alternatively, the discovery signal may not include any CRC (e.g., such as a PRACH signal), and the signal acknowledgment may be determined based on metric thresholds, (such as the ones described herein).

The discovery signal may include one or several parameters to check before acceptance. Group membership or discovery priority may be check, (e.g., if the receiver does not recognize the group membership it may stop and not accept the discovery signal and may also terminate the discovery procedure). The priority that may be set in the discovery signal may be lower than the current minimum level set at the receiver, (e.g., because its battery level may already low). In that case, the receiver may terminate the procedure.

The methods described herein may be combined to take the final decision. These acceptance criteria may be used for the signal acknowledgment decision and/or for device higher layer procedures or applications.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A first wireless transmit/receive unit (WTRU) configured to perform device-to-device (D2D) discovery, the first WTRU comprising:
   a transceiver; and
   a processor, wherein
   the transceiver is configured to receive, from a network node, a first radio resource control (RRC) message including a system information block (SIB) that indicates a set of D2D resources;
   the processor is configured to randomly select a first D2D resource from the set of D2D resources for sending a discovery signal to a second WTRU in proximity to the first WTRU; and
   the transceiver is configured to send the discovery signal to the second WTRU using the first D2D resource to initiate a discovery procedure, wherein the discovery signal is followed by a guard time.

2. The first WTRU of claim 1, wherein the discovery signal includes a data payload.

3. The first WTRU of claim 1, wherein the discovery signal includes a discovery identity associated with an application that triggered the discovery procedure.

4. The first WTRU of claim 1, wherein:
   the transceiver is further configured to send a D2D synchronization signal to the second WTRU using a second D2D resource, wherein the second D2D resource is randomly selected from the set of D2D resources.

5. A method, performed by a first wireless transmit/receive unit (WTRU), for device-to-device (D2D) discovery, the method comprising:
   receiving, from a network node, a first radio resource control (RRC) message including a system information block (SIB) that indicates a set of D2D resources;
   randomly selecting a first D2D resource from the set of D2D resources for sending a discovery signal to a second WTRU in proximity to the first WTRU; and
   sending the discovery signal to the second WTRU using the first D2D resource to initiate a discovery procedure, wherein the discovery signal is followed by a guard time.

6. The method of claim 5, wherein the discovery signal includes a data payload.

7. The method of claim 5, wherein the discovery signal includes a discovery identity associated with an application that triggered the discovery procedure.

8. The method of claim 5, further comprising sending a D2D synchronization signal to the second WTRU using a second D2D resource, wherein the second D2D resource is randomly selected from the set of D2D resources.

* * * * *